Aug. 8, 1950           A. H. GOREY           2,517,658
CURTAIN SHUTTER OPERATING MECHANISM
FOR PHOTOGRAPHIC CAMERAS
Filed Oct. 23, 1945           11 Sheets-Sheet 1
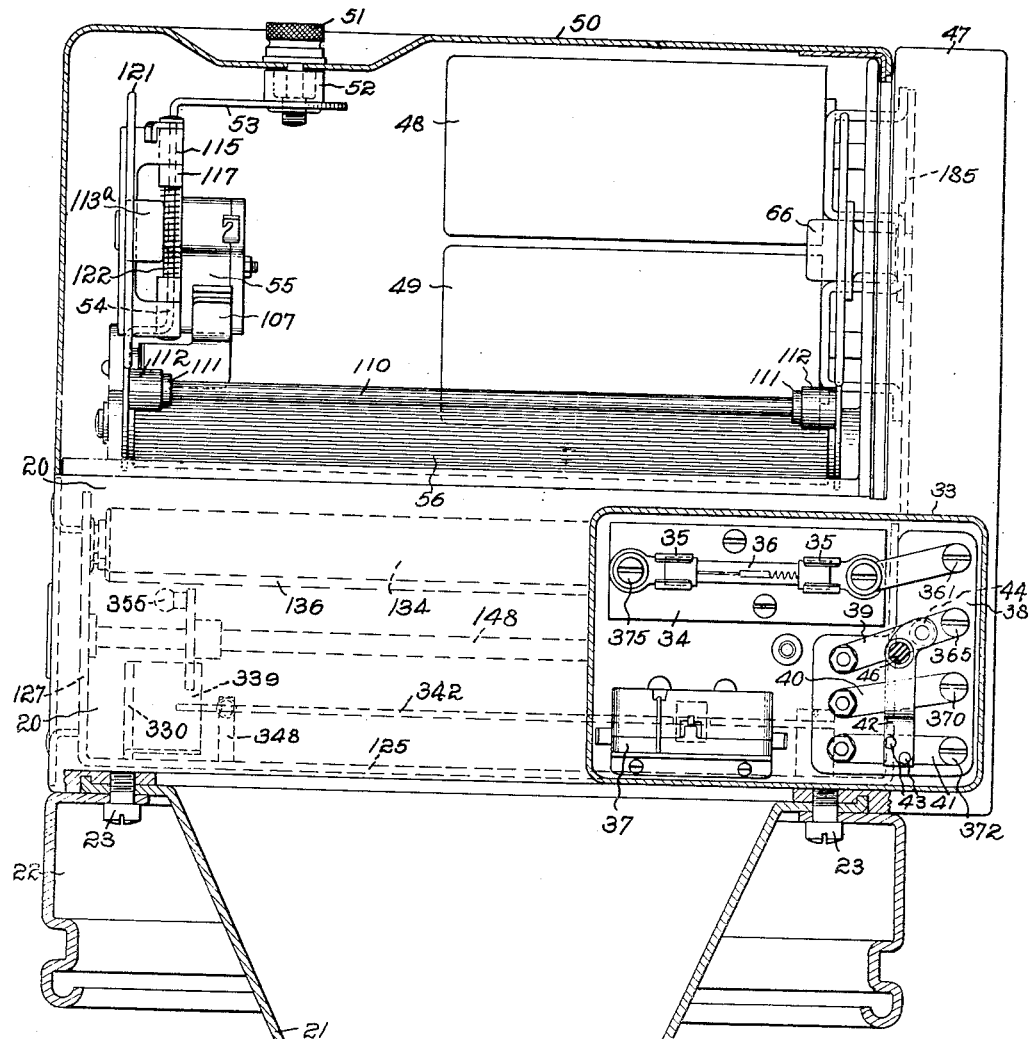
Fig. 1.
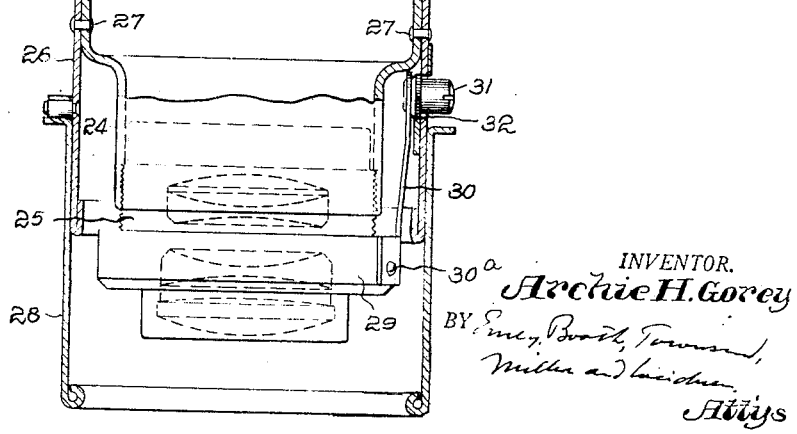
INVENTOR.
Archie H. Gorey
BY
Attys Aug. 8, 1950

A. H. GOREY 2,517,658

CURTAIN SHUTTER OPERATING MECHANISM
FOR PHOTOGRAPHIC CAMERAS

Filed Oct. 23, 1945

INVENTOR.
Archie H. Gorey
BY
Attys

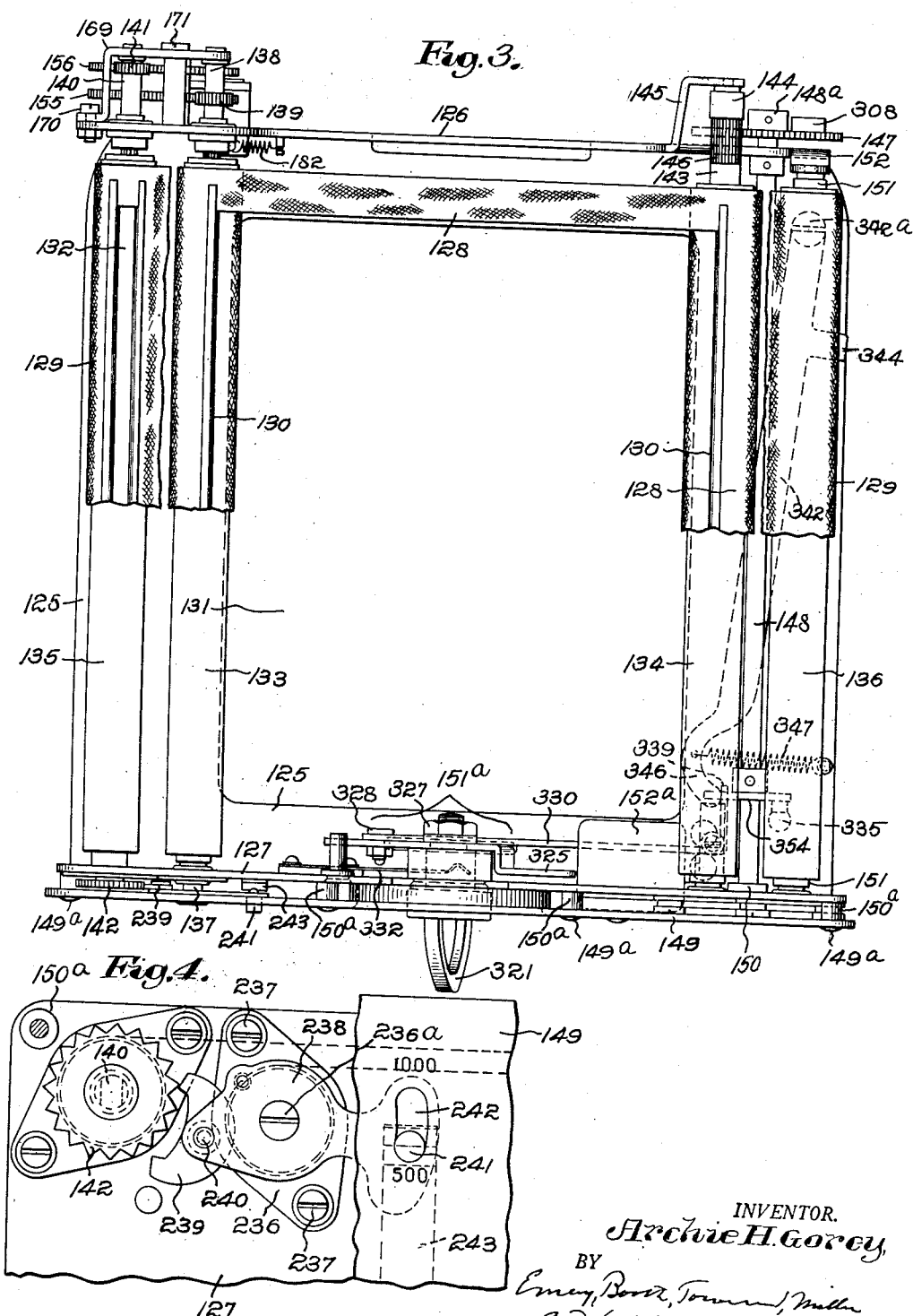

Aug. 8, 1950
A. H. GOREY
2,517,658
CURTAIN SHUTTER OPERATING MECHANISM
FOR PHOTOGRAPHIC CAMERAS
Filed Oct. 23, 1945
11 Sheets-Sheet 4
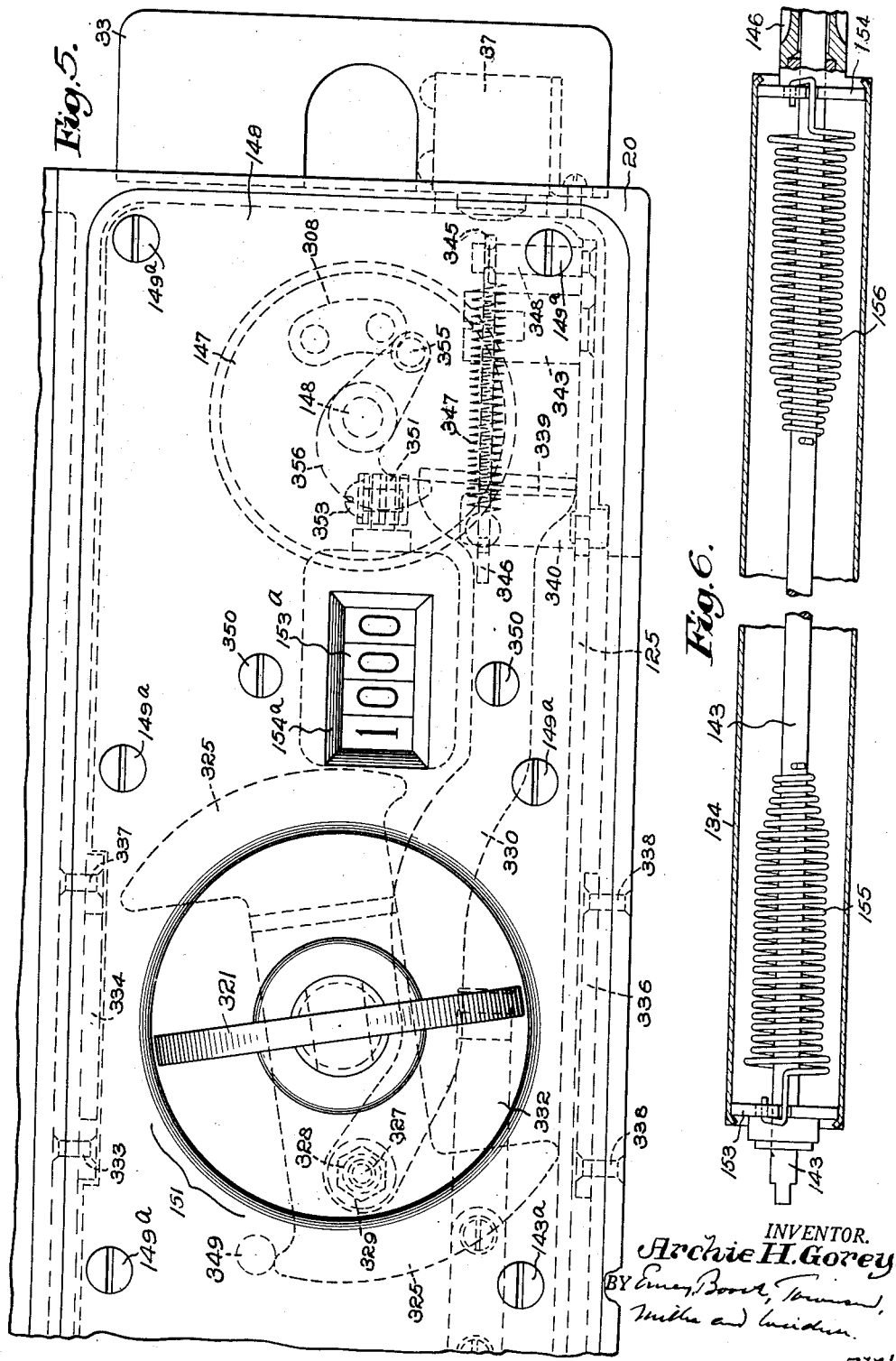
INVENTOR.
Archie H. Gorey.
BY Emery, Booth, Fanning,
Miller and Snedeker
Attys

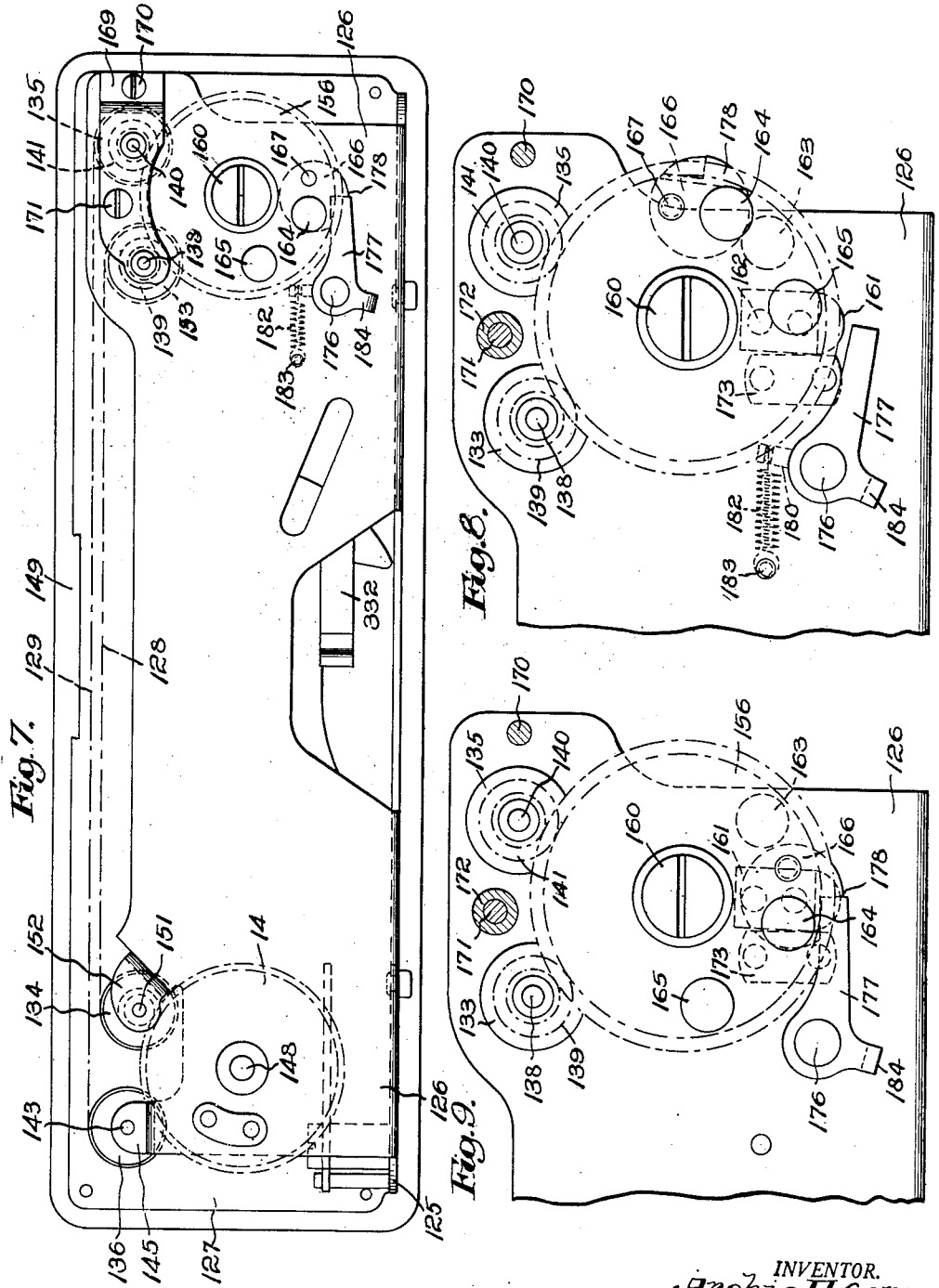

Aug. 8, 1950  A. H. GOREY  2,517,658
CURTAIN SHUTTER OPERATING MECHANISM
FOR PHOTOGRAPHIC CAMERAS
Filed Oct. 23, 1945  11 Sheets-Sheet 6

INVENTOR.
Archie H. Gorey,
BY
Emery, Booth, Townsend, Millen and Vinidge
Attys.

Aug. 8, 1950

A. H. GOREY 2,517,658

CURTAIN SHUTTER OPERATING MECHANISM
FOR PHOTOGRAPHIC CAMERAS

Filed Oct. 23, 1945

INVENTOR.
Archie H. Gorey
BY
Emery, Booth, Townsend, Miller and Weidner
Attys

Aug. 8, 1950

A. H. GOREY 2,517,658

CURTAIN SHUTTER OPERATING MECHANISM FOR PHOTOGRAPHIC CAMERAS

Filed Oct. 23, 1945

INVENTOR.
Archie H. Gorey
BY
Attys

Aug. 8, 1950     A. H. GOREY     2,517,658
CURTAIN SHUTTER OPERATING MECHANISM
FOR PHOTOGRAPHIC CAMERAS
Filed Oct. 23, 1945     11 Sheets-Sheet 9

INVENTOR.
Archie H. Gorey

Aug. 8, 1950

A. H. GOREY 2,517,658

CURTAIN SHUTTER OPERATING MECHANISM
FOR PHOTOGRAPHIC CAMERAS

Filed Oct. 23, 1945

INVENTOR.
Archie H Gorey
by
Attys

Aug. 8, 1950 A. H. GOREY 2,517,658
CURTAIN SHUTTER OPERATING MECHANISM
FOR PHOTOGRAPHIC CAMERAS
Filed Oct. 23, 1945 11 Sheets-Sheet 11
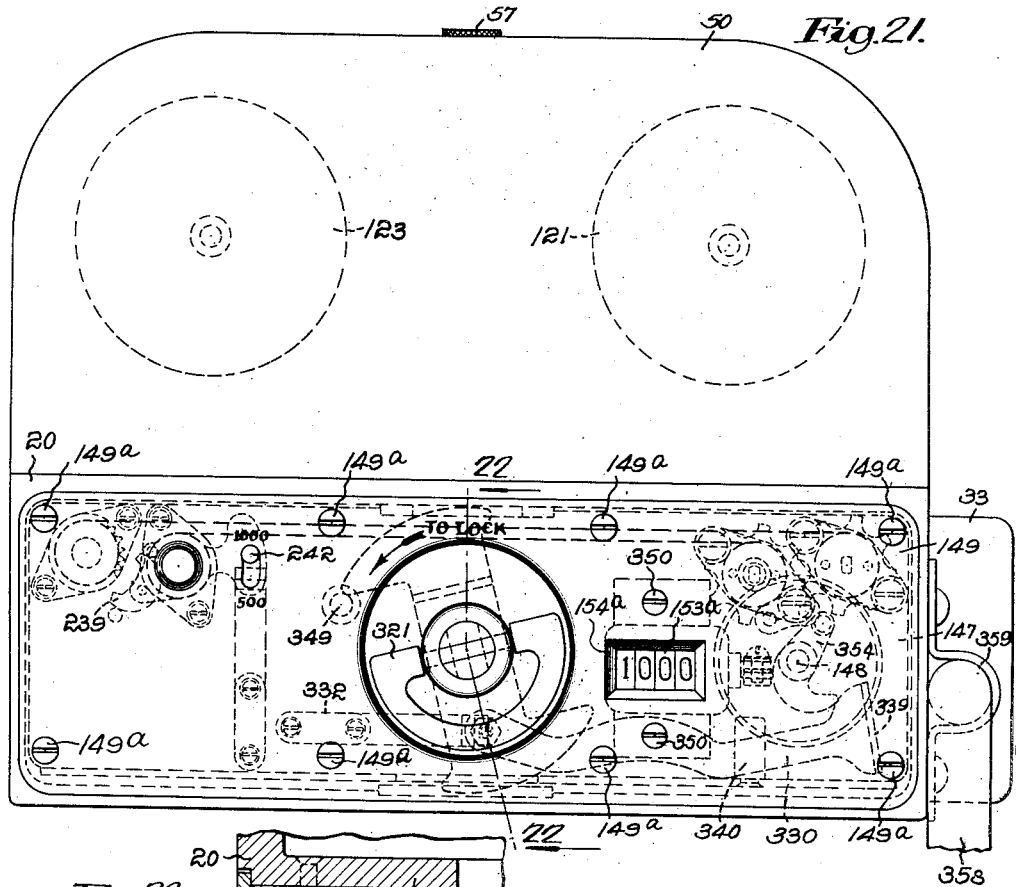
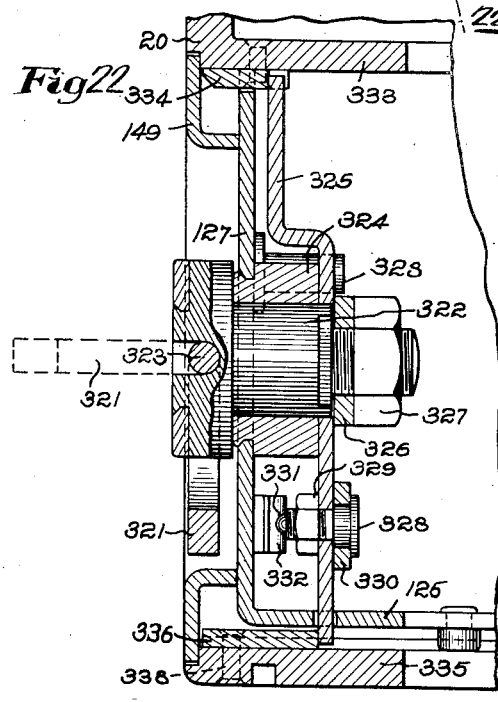
INVENTOR.
Archie H. Gorey
BY
Attys.

Patented Aug. 8, 1950

2,517,658

UNITED STATES PATENT OFFICE 2,517,658

CURTAIN-SHUTTER OPERATING MECHANISM FOR PHOTOGRAPHIC CAMERAS

Archie H. Gorey, Rochester, N. Y., assignor to Graflex, Inc., Rochester, N. Y., a corporation of Delaware Application October 23, 1945, Serial No. 623,913

16 Claims. (Cl. 95—57)

This invention relates to curtain-shutter operating mechanism for photographic cameras, and particularly to cameras adapted for making aerial photographs.

In order that the principle of the invention may be readily understood, I have disclosed a single embodiment thereof in the accompanying drawings, wherein:

Fig. 1 is a side elevation of the camera, partly in vertical section, to show the magazine structure, the placement of the motors and the lens mounting structure;

Fig. 3 is a top plan view of the removable shutter shown removed from the camera, both the shutter curtain and the capping curtain being shown and the mechanism being in condition for making an exposure;

Fig. 4 is a fragmentary detail, partly sectioned respecting the right-hand end of the shutter mechanism viewing Fig. 3, and showing the shutter speed control mechanism;

Fig. 5 is a partial end elevation of the camera body showing the main shutter plate and latching means for locking the shutter mechanism into the camera, and showing the exposure counter;

Fig. 6 is an enlarged detail in longitudinal section of one of the shutter curtain tension rollers;

Fig. 7 is a right-hand end view of the shutter mechanism viewing Fig. 3, and showing the shutter mechanism in condition for making an exposure;

Fig. 8 is an enlarged fragmentary detail of Fig. 7, showing the shutter when in run-down condition;

Fig. 9 is a view similar to Fig. 8, but showing the shutter in fully wound condition and the capping curtain in open condition;

Fig. 21 is a left-hand end view of Fig. 1, the lens cone being removed to show the shutter locking mechanism;

Fig. 22 is a section through Fig. 21 on the line 22—22 thereof.

Figure 2:
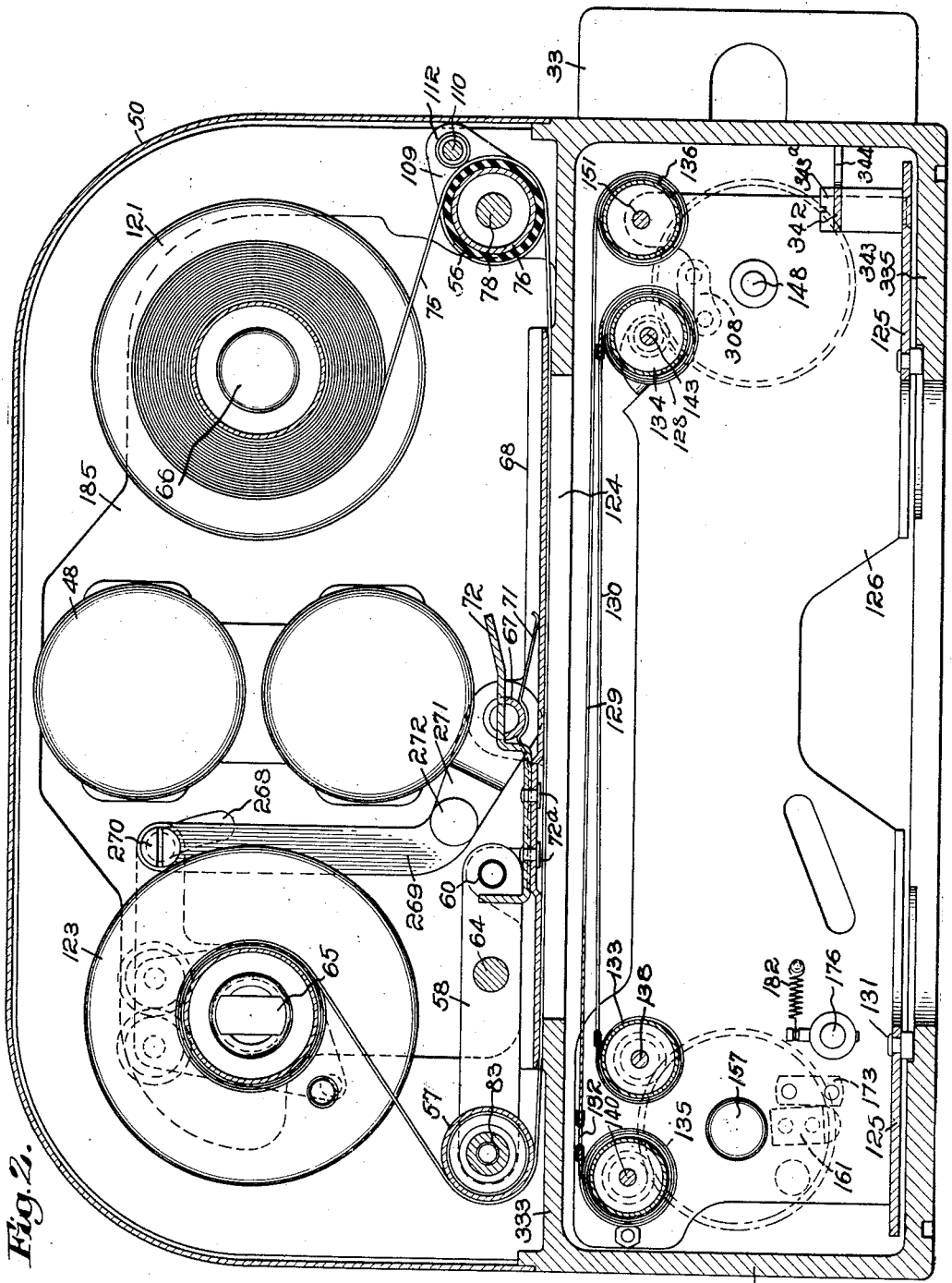
Fig. 2 is a vertical section through the camera body in the magazine, showing the position of the film spools, the camera drive motors, the film idler roll, the film measuring roll, the focal plane shutter and the capping curtain, the shutter being in condition for making an exposure.

The camera herein disclosed is novel in its design and mechanical construction, in that it is fabricated from sheet metal, using most modern methods of fabrication of these materials. This makes for very high speed production and when built in reasonable quantities permits a very low production cost.

Among the objects of the invention herein claimed are: to provide an automatic motor-driven camera having a completely removable shutter assembly; to provide a camera having an improved automatic capping curtain; to provide a camera having automatic means to prevent the release of the camera shutter when the shutter is in the capped condition; and to provide a series of interlocks to prevent operation of the camera at any time prior to the completion of any part of a cycle or if any of the camera parts or assemblies are not properly locked.

General structure

Referring more particularly to the drawings, and first to Fig. 1 showing a large plan view of the invention with certain parts broken away, the camera is made up of the following basic parts. The camera body is shown at 20, the lens cone at 21, and the camera support ring at 22. The lens cone 21 and the support ring 22 are secured to the camera body by means of screws 23, 23. Threaded into a neck 24 of the lens cone 21 is a lens barrel 25 carrying the usual photographic lens. Attached to the lens cone 21 and extending therefrom is a cylindrical member 26 fastened to said lens cone 21 by rivets 27, 27. Fitted over the cylindrical member 26 is a sunshade tube 28. The lens barrel 25 is fitted with the usual diaphragm adjusting ring 29, and attached to said ring and extending therefrom is a member 30 having a knob 31 extending through a slot 32 in the cylindrical member 26.

Attached to the camera body 20 is a junction box 33 carrying a fuse block 34, fuse clips 35, 35 and a fuse 36. A safety switch, to be subsequently referred to in more detail, is also carried in the junction box 33 and is indicated at 37. The said junction box 33 is equipped with an insulated block 38 having bus bars 39, 40 and 41. A cross bar 42, attached to the bus bar 41 by rivets 43, 43, constitutes a switch for operating the camera. The said cross bar 42 is equipped with a contact 44 and the bus bar 39 is equipped with a contact, shown in dotted lines and indicated at 45. Said cross bar 42 is also provided with an insulated operating button 46.

Attached to the right-hand end of the camera body 20 is a mechanism-housing indicated at 47, to which are attached motors 48, 49, to be referred to in detail subsequently. A magazine cover, indicated at 50, has for its purpose to enclose the sensitized material and to enclose suitable supports and driving and measuring means for said sensitized material. A magazine holddown screw 51 is threaded into a bushing 52 carried by a projecting member 53 of a magazine end frame member 54. The end of a film switch is indicated at 55 and is carried by the magazine end frame 54.

A measuring roller is shown at 56 and at 57 is shown an idler roll carried on arms 58, 59. The arm 58 is pivoted at a stud 60 and the arm 59 is pivoted at a stud 61. The said stud 60 is carried by the wall 62 of the mechanism-housing 47, and the stud 61 is carried by the magazine endframe member 54, being attached thereto by a nut 63. The said arms 58, 59 are held in proper spaced relation by a spacing rod 64.

A take-up film spool drive dog is indicated at 65 and a supply spool pivot at 66. A pressure pad operating bar or rod 67 is fitted in suitable bearings in the mechanism housing wall 62 and the magazine end plate 54. The pressure pad itself is indicated at 68. The said pressure pad is held in place by springs 69, 70, 71 and 72, the spring 69 being held to the pressure pad by rivets 69a, 69a, the spring 70 being held thereto by rivets 70a, 70a, the spring 71 being held thereto by rivets 71a, 71a, and the spring 72 being held thereto by rivets 72a, 72a.

When the pressure pad operating bar or rod 67 is in position, the pressure pad 68 is held in contact with the film which is indicated at 75. When the pressure pad operating bar or rod 67 is rotated, the pressure pad 68 will be raised from contact with the film 75.

The measuring roller 56 is made up of a metal tube 76 covered on its outer surface with rubber or other suitable material, as clearly indicated in Fig. 2. A shaft 78 passes entirely through the tube 76 and is fitted in suitable bearings in the magazine end plate 79 and the mechanism-housing wall 62.

The path of the film through the camera is most clearly indicated in Fig. 2, wherein the film 75 is shown as fed off the supply spool 121 whence it passes around the measuring roller 56, under the idler rolls 112, 112, under the pressure pad 68, around the idler rolls 57, 57, and thence onto the take-up spool 123. In loading film into the camera, the film supply spool 121 is first placed in its support, and a sufficient length of film is drawn off to reach to the take-up spool 123.

The shutter assembly or unit

The shutter of the camera is of novel construction. One of the main features thereof allows the shutter assembly or unit in its entirety to be removed from and to be replaced in the camera without disturbing any of the camera mechanism. This is a very important development for cameras used in the armed forces of the United States, in that it permits the rapid substitution of a new shutter, either for the purpose of replacing a damaged shutter or for the purpose of equipping the camera with a shutter having other characteristics than the one removed.

There will next be described the construction of the shutter and its application and relation to the other parts of the camera, and in so doing reference will be made to Figs. 2 to 13, and first to Figs. 2 and 3.

In Fig. 3 the shutter structure is shown as removed from the camera for any purpose. In Fig. 2, the shutter assembly unit or housing is shown in position within the camera structure.

The shutter assembly, unit or housing, which may be of thin sheet metal, is made up of a base plate 125 having an upstanding member 126 on that end which is shown nearest the top of the sheet in Fig. 3, and is subsequently referred to for convenience of description as the upper end. Said assembly, unit or housing has a second or lower upstanding end 127 at the opposite end of the said base plate 125. Said upper and lower upstanding end members 126 and 127 form vertical walls between which are mounted the shutter curtain rolls.

The shutter itself, as best shown in Fig. 2, is made up of two curtains, namely, a capping curtain 128 and a shutter curtain 129, the former having an aperture 130 constituting an opening slightly greater than the opening 131 in the shutter base plate or member 125. The shutter curtain 129 is provided with an aperture 132 which is relatively narrow, the width depending upon the shutter speed desired. In the disclosed embodiment, to which the invention is not restricted, there is provided an aperture approximately $\frac{1}{16}$ of an inch in width, thus allowing a shutter speed of $1/500$ and $1/1000$ of a second.

The capping curtain 128 is wound at one end on the capping curtain take-up roll 133 and at its outer end on the tension roll 134. The shutter curtain 129 is wound at one end on the shutter curtain rewind roll 135 and at its other end on the shutter curtain tension roll 136. The shutter capping curtain roll 133 is provided with a shaft 137 passing through a suitable bearing in the lower upstanding end member 127. The opposite end of the capping curtain roll 133 is provided with a shaft 138 that passes through a suitable bearing in the upper upstanding member 126. To the shaft 138 there is fastened in any suitable manner a pinion 139. The shutter curtain rewind roll 135 is also provided on its lower end, viewing Fig. 3, with a shaft 140 that is fitted into a suitable bearing in the lower upstanding member 127. The said shaft 140 also extends through a suitable bearing in the upper upstanding member 126, To the upper end of said shaft 140, viewing Fig. 3, is attached a pinion 141, and to its lower end is attached a retard ratchet 142, referred to more fully subsequently.

The capping curtain tension roll 134 is provided with a shaft 143, the lower end whereof, viewing Fig. 3, passes through a suitable bearing in the lower upstanding member 127. The upper end of the said shaft 143 is provided with a bearing 144 in an extension 145 of the said upper upstanding member 126. The said shaft 143 is also provided with a pinion 146 meshing with a capping curtain gear 147 carried on a shaft 148 and keyed thereto by a pin 148a. The lower end of said shaft 148, Fig. 3, rides in a bearing 150 in the lower upstanding member 127. The function of said shaft will be referred to more fully subsequently.

The shutter curtain tension roll 136 is provided with a shaft 151, the lower end whereof is fitted into a suitable bearing carried by the lower upstanding member 127. The upper end of the said shaft 151 is carried in a suitable bearing fitted to an extension 152 integral with the upper upstanding member 126.

The tension rolls

The construction of the tension rolls, which are substantially identical, will next be described, reference being made to Fig. 6, wherein is shown the tension roll 134. As there shown, it is formed as a preferably metallic tube and to the left-hand end thereof is fitted a bearing member 153 having a suitable hole for the shaft 143. To the right-hand end of the said tube 134 is fitted a bearing plate 154 through which said shaft 143 passes and to which shaft is attached the pinion 146, as already stated. Secured to the shaft 143 is a coiled tension spring 155, the left-hand end whereof is fastened to the bearing plate 153. Also secured to the shaft 143 is a tension spring 156 to the right-hand end whereof is attached said bearing plate 154.

Heretofore for similar structures constituting tension rolls for focal plane shutters, one spring only has been used so far as I am aware, and inasmuch as the over-all length of such spring changes when winding the curtain shutter, a thrust was necessarily always introduced into the assembly. In the disclosed construction, which I believe to be broadly novel for the purpose, the spring is split up into a plurality of units, preferably two, and is stretched a distance equal to the spring elongation when fully wound. Thus the shaft 143 is always held in a central position within the tube or roll 134 and no end thrust is ever imparted to the shaft 143. This construction provides a smoother running shutter and eliminates one of the most annoying variables that has heretofore always existed in focal plane shutters so far as I am aware.

The shutter mechanism

Referring again to Fig. 3, the lower end of the shutter assembly, unit or housing is there shown as provided with a second or cover plate 149 attached to the lower upstanding member 127 by suitable screws 149a, 149a and spaced therefrom by spacer members 150a, 150a. Carried by the cover plate 149 is a locking mechanism which is indicated generally at 151a and which will be more specifically described subsequently. There is also carried by the cover plate 149 an exposure counter 152a, the dial 153a whereof is shown most clearly in Figs. 5 and 21, being visible through an opening 154a of the said cover plate 149.

Reference will next be made to the shutter operating mechanism, shown in Figs. 7 to 13.

Referring first to Fig. 7, an end view of the shutter structure is therein represented as removed from the camera structure and the arrangement of the operating parts is therein clearly evident. In Fig. 7 the shutter is shown as in a wound-up condition ready for making an exposure, the capping curtain 128 having just previously been allowed to run down, thus uncovering the exposure aperture.

Figure 10:
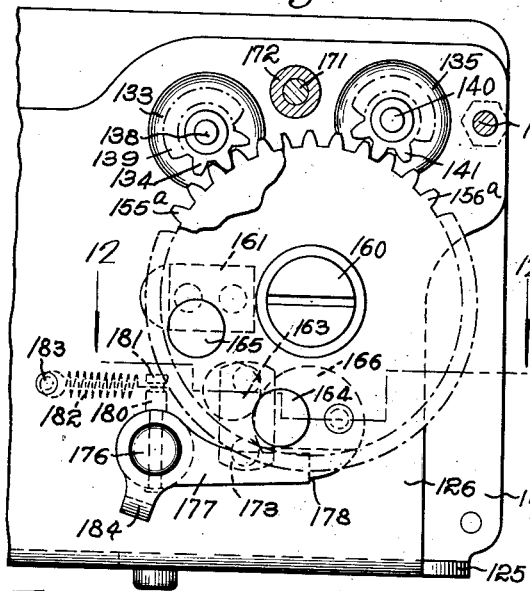
Fig. 10 is a fragmentary, partly sectioned, detail similar to Fig. 8, but showing the shutter in fully rewound condition, the capping curtain being in the capping condition just as the capping curtain is released to run down to open condition.

The shutter parts will therefore be in the condition shown in Fig. 10, wherein the pinion 139 meshes with the capping curtain rewind gear 155a, and the pinion 141 meshes with the shutter curtain rewind gear 156a. The capping curtain rewind gear 155a and the shutter rewind gear 156a are both mounted on a stud 157 which is securely attached to the upper upstanding member 126 of the shutter assembly, unit or housing. The said stud 157 has a reduced diameter at the left of the upper upstanding member 126, viewing Fig. 3, and upon which the rewind gears 155a and 156a are free to rotate. Also carried by the extending shaft portions of the stud 157 are spacing washers 158 and 159.

The assembly, consisting of the shutter rewind gears 155a and 156a and the spacing washers 158, 159, is held to the stud 157 by a retaining screw 160. Secured to the capping curtain rewind gear 155a is a cam block and capping curtain gear stop, shown in dotted lines at 161, being secured by rivets 162, 162. Also secured to the capping curtain rewind gear 155a is a driving stud 163, and attached to the curtain rewind gear 156a is a switch operating pin 164 and a shutter curtain stop pin 165. To the shutter curtain rewind gear 156a a shutter release dog and curtain rewind drive member 166 is attached by a rivet 167 and by a projection 168 of the switch operating pin 164.

Figure 11:
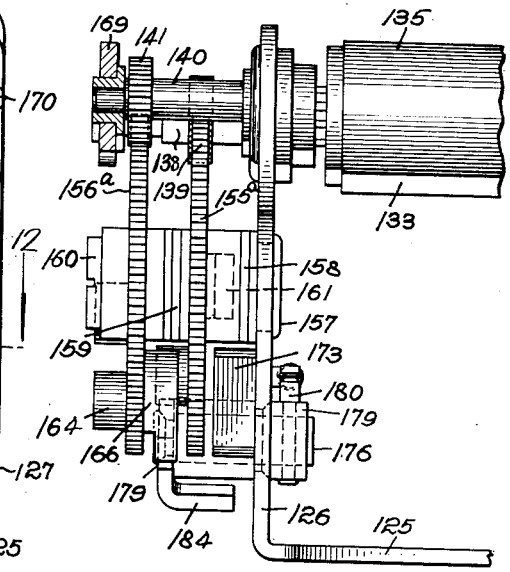
Fig. 11 is a right-hand end view of Fig. 10.
Figure 19:
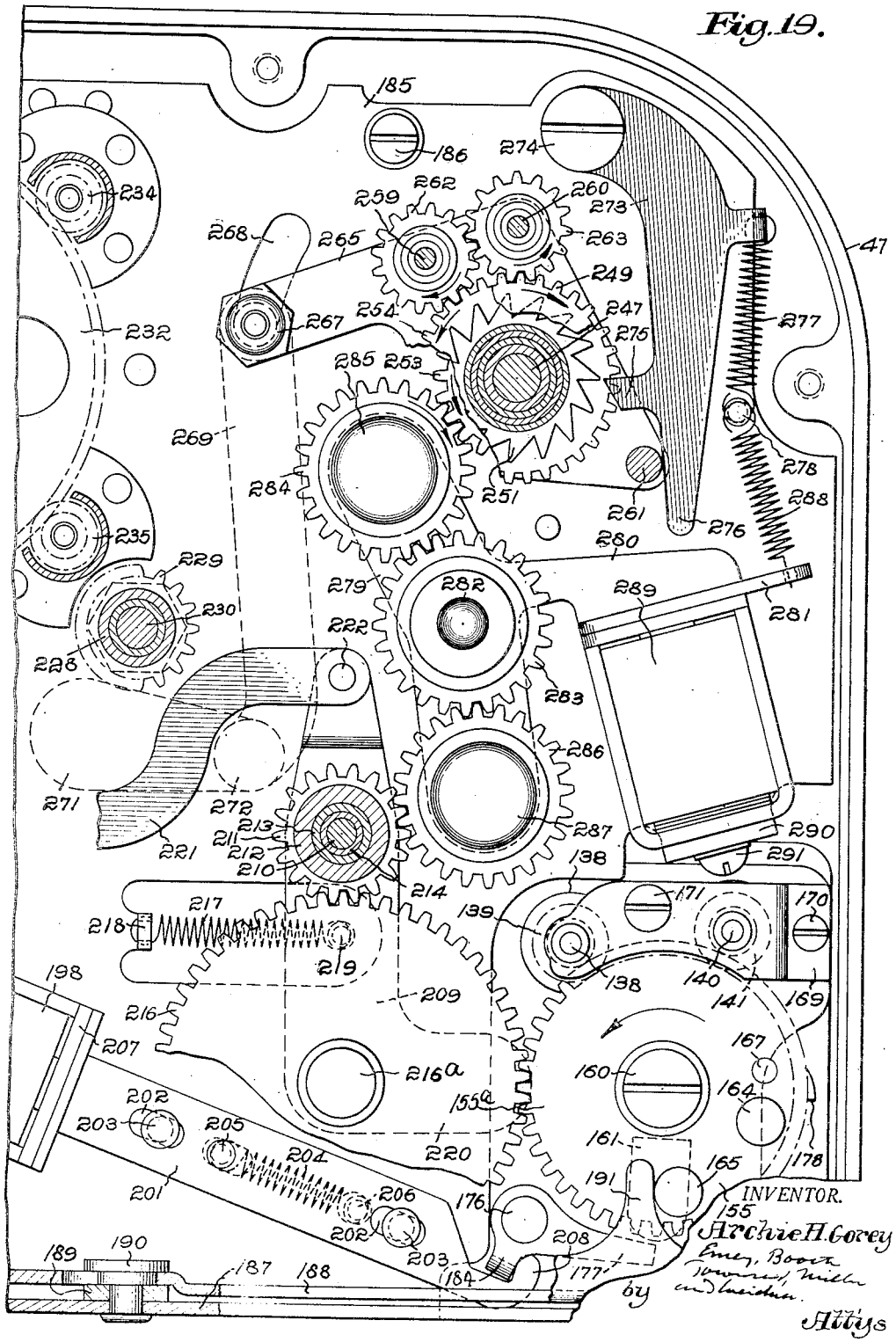
Fig. 19 is an enlarged detail of the right-hand side of Fig. 16, showing the construction of the film rewind clutch and the shutter rewind mechanism.

The outer end of the capping curtain shaft 138 and the outer end of the shutter curtain shaft 140 are supported by an out-board bearing bracket, indicated at 169 in Figs. 7, 11 and 19. The said bearing bracket 169 is fastened to the upper upstanding member 126 of the shutter assembly, unit or housing by screws 170 and 171. The said bearing bracket 169 is spaced from the upper upstanding member 126 by a suitable bushing 172. Also secured to the said upper upstanding member 126 is a stop plate 173, shown in full lines in Fig. 11 and in dotted lines in Figs. 8 and 9. The said stop plate 173 is secured to the said upper upstanding member 126 by rivets 174, 174. Also fastened to the said upper upstanding member 126 is a bushing 175 through which passes a shaft 176, shown in Figs. 10 and 12. To one end of said shaft 176 there is attached a release pawl or latch member 177 engaging a notch 178 of the shutter release dog and curtain rewind drive member 166. To the opposite end of the shaft 176 a spacing collar 179 is secured by a pin 180 having an end extension 181 to which is hooked a spring 182, the opposite end whereof is attached to a pin 183 on the upper upstanding member 126. The purpose of the spring 182 is to cause the shutter release pawl or latch member 177 to be rotated in a contraclockwise direction viewing Fig. 10. The said shutter release pawl or latch member is provided with a turned-in end 184, best shown in Fig. 11.

Reference will next be made to Figs. 12 to 15.

The mechanism housing 47 has attached to its inner wall 62 a mechanism plate 185, being secured thereto by screws 186, 186. Said mechanism plate 185 is provided with suitable openings through which extend parts of the shutter rewinding mechanism and the gear 147 controlling the film rewind. The lower edge of said mechanism plate 185 is turned upwardly at 187 where there is attached a shutter switch operating bar 188 spaced from the extension 187 by washers 189, 189, and held thereto by rivets 190, 190, but so as to be free to move in a lateral direction. One end of the shutter switch operating bar 188 is provided with a finger-like formation 191 engaged by the pin 164, when the shutter is rewound, thus moving the shutter switch operating bar 188 to the right, viewing Fig. 16. The said shutter switch operating bar 188 is moved to the left by the pin 165, when the shutter runs down, thus operating the shutter rewind switch 192. An adjusting screw 193 is provided on the shutter switch operating bar 188 and has a lock nut 194, the purpose of the said adjusting screw being to provide means for compensation for inaccuracies or variations in the switch 192.

The shutter switch operating bar 188 is provided with elongated slots (not shown) to permit the said bar 188 to be moved in a lateral direction sufficiently to operate the shutter rewind switch 192. The finger-like formation 191 also serves to retard the shutter curtain rewind gear 156a when running down. A spring 195 having a detent 196 is provided for imparting a slight resistance to the movement of the shutter switch operating bar 188. The said detent 196 engages holes 197, 197 in the shutter switch operating bar 188 when the latter reaches the limit of its motion in either direction.

Figure 16:
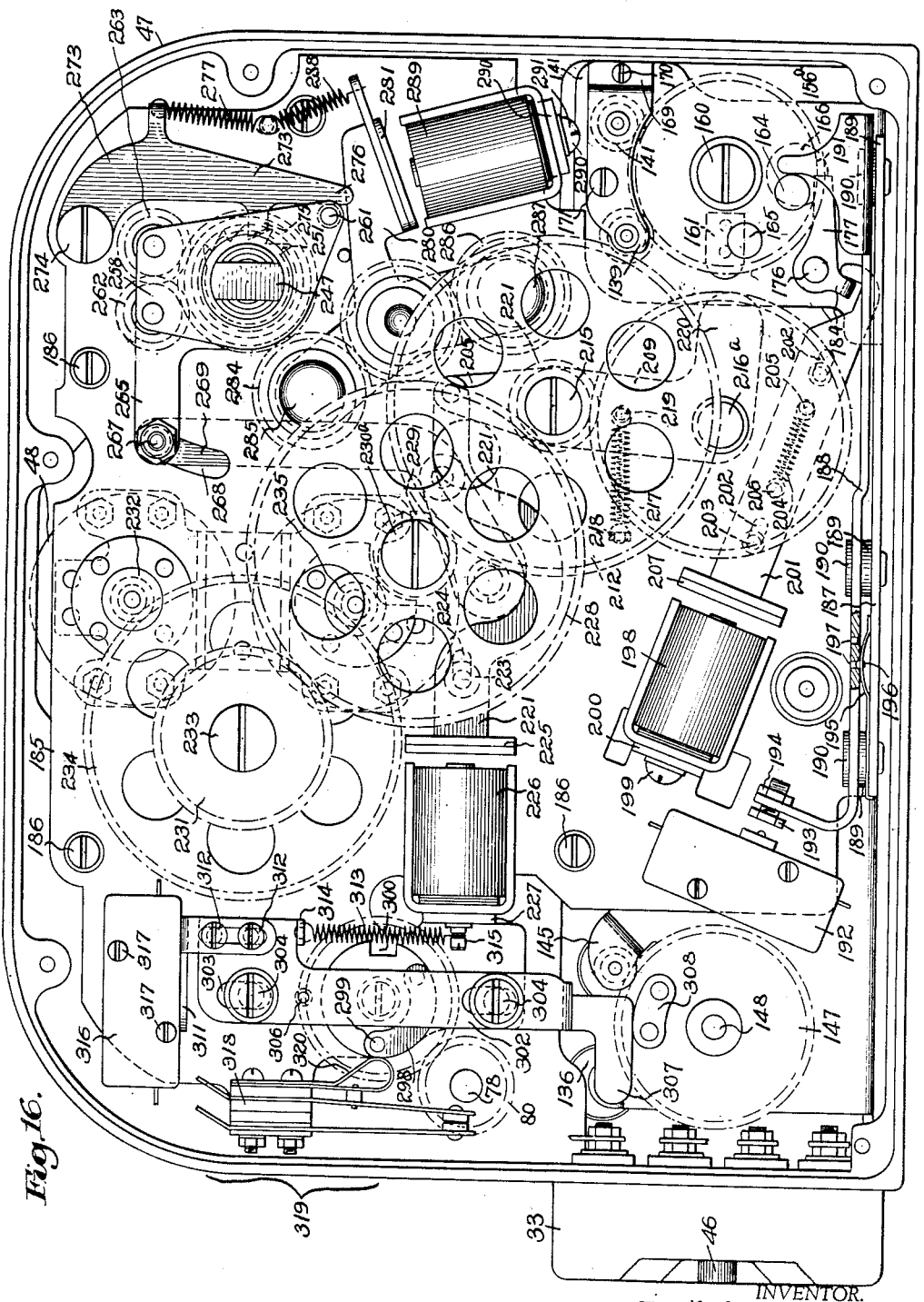
Fig. 16 is a front elevation of the camera mechanism housing with the cover plate removed, clearly showing the camera operating mechanism.

A solenoid magnet 198 is also attached to the mechanism plate 185 by a screw 199, and an upturned ear 200 is provided for supporting the said magnet 198. A sliding bar-like member 201 having elongated openings 202, 202 is secured to the mechanism plate 185 by rivets 203, 203. A coiled spring 204 causing the bar-like member 201 to move in a right-hand direction is hooked at one end to a pin 205 secured to the mechanism plate 185 and at its other end is hooked to a second pin 206 secured to the bar 201. Secured to the left-hand end of the bar-like member 201, viewing Fig. 16, is an armature 207 acted upon by a magnet 198 to release the shutter through a hook-like member 208 engaging the L-shaped end 184 of the latch-like member or lever 177.

Referring now particularly to Fig. 19, there is secured to the mechanism plate 185 a bell crank 209 pivoted on a shoulder stud 210, whereon is also pivotally mounted a pinion 211 and an idler gear 212, the latter being provided with a bushing 213 riding on a sleeve 214 carried by the said shoulder stud 210. The said bell crank 209, the pinion 211 and the idler gear 212 are all held to the mechanism plate 185 by a large head screw 215. Carried on the lower end of the bell crank 209 is a gear 216, a shoulder stud 216a holding said gear 216 in position but free to rotate. The said gear 216 meshes constantly with the pinion 211 and with the capping curtain rewind gear 155a when the shutter is being rewound.

The bell crank 209 is caused to move in a clockwise direction about the shoulder stud 210 as a pivot, by a coiled spring 217, Fig. 19, attached at one end to an upturned ear 218 integral with the mechanism plate 185 and attached at its other end to a pin 219 permanently secured to the bell crank 209. The lower end of the latter is provided with an arm 220 engaged by the cam block and capping curtain gear stop or knock-out 161, when the shutter is completely rewound, in a manner subsequently described. To the upper end of the bell crank 209 a connecting link 221 is attached by means of a shoulder rivet 222. The opposite end of the said connecting link 221 rides on a shoulder rivet 223 fitted into an elongated opening 224, shown in dotted lines in Fig. 16. To the opposite end of the said connecting link 221 there is attached a magnet armature 225 acted upon by a shutter rewind clutch magnet 226 that is carried on the upturned ear 227 of the mechanism plate 185.

There is also secured to the said mechanism plate 185 a second idler gear 228 having a pinion 229 meshing with the first idler gear 212. The said gear 228 and the pinion 229 are carried on a stud 230, shown in Fig. 19, and held thereto by a large head screw 230a. The said gear 228 meshes with a pinion 231 integral with the main drive gear 232, said pinion and said main drive gear being carried on a suitable stud attached to the mechanism plate 185 and held thereto by a large head screw 233. The motor 48, previously referred to, is provided with a pinion 234 meshing with the said main drive gear 232, and the motor 49, previously referred to, is also provided with a pinion 235 meshing with the said main drive gear 232, the said motors 48 and 49 being in parallel with the said drive gear 232.

The operation of the shutter

There will next be described the operation of the shutter, and for that purpose reference will be made to Figs. 2, 3, 6 to 16 and 19.

In Figs. 2 and 7, the capping curtain 128 and the shutter or aperture curtain 129 are shown in their relation to the shutter rewind gears. In both of said figures, the shutter is shown in a rewound condition ready for making an exposure, the capping curtain 129 having been previously released and allowed to run down to an open condition. The shutter or aperture curtain 129 is held ready for making an exposure. The mechanism will be in the condition shown in Figs. 3 and 16.

An electrical current will be supplied to the shutter release magnet 198 causing the armature 207 to be moved to the left viewing Fig. 16, and carrying with it the shutter release bar 201 and the hook 208. The latter will engage the bent-over end 184 of the shutter release pawl or lever 177, and will cause it to be rotated in a clockwise direction, thereby disengaging said shutter release pawl or lever 177 from the dog 178, Figs. 8 and 9, thus allowing the shutter curtain rewind gear 156a to rotate in a clockwise direction, and the pinion 141 and the shutter curtain roll 135 will rotate in a contraclockwise direction, thereby allowing the curtain aperture 132 to travel across the exposure opening of the camera, i. e. in a right-hand direction, viewing Fig. 3, under the influence of the tension roll 136.

When the shutter curtain rewind gear 156a reaches the condition shown in Fig. 8, the shutter curtain aperture 132 will have traveled all the way across the exposure opening of the camera. The shutter curtain rewind gear 156a will be stopped from further rotation because the curtain rewind drive member 166 will have engaged the rewind pin 163 carried by the capping curtain gear 155a. The finger 191 of the shutter switch operating bar 188 will be caused to be moved to the left, viewing Fig. 19, thus operating the shutter rewind switch 192 in the manner previously described. This will cause an electrical current to flow in the shutter rewind clutch member 226, Fig. 16, causing the armature 225 and the connecting link 221 to be moved to the left, viewing Fig. 16, causing the bell crank 209 to be rotated in a contraclockwise direction, thus engaging the idler gear 216 and the capping curtain gear 155a. The motors 48 and 49 will also be energized and will cause their respective pinions to rotate, and since the pinions 234 and 235 are in mesh with the main drive gear 232, the pinion 231, the idler gear 228, the pinion 229, the idler gear 212, the pinion 211 and the idler gear 216 will also rotate, causing the capping curtain rewind gear 155a to rotate in a contraclockwise direction viewing Fig. 19.

The capping curtain roll 133 will now start to rotate inasmuch as its pinion 139 is in mesh with the capping curtain rewind gear 155a. The shutter curtain rewind gear 156a will also be caused to rotate in a contraclockwise direction, inasmuch as the pin 163 carried by the capping curtain rewind gear 155a will be in engagement with the shutter release dog or curtain rewind drive member 166 carried by the shutter curtain rewind gear 156a.

The shutter curtain roll 135 will be caused to turn in a clockwise direction by pinion 141 meshing with the shutter curtain rewind gear 156a. Both the said curtains will be wound on their respective rolls until they are fully rewound, but just before the shutter curtain reaches the condition of being "fully rewound," the capping curtain gear stop or knock-out cam 161 carried by the capping curtain rewind gear 155a will act upon the projecting end 220 of the bell crank 209, causing the idler gear 216 to be disengaged from the capping curtain rewind gear 155a.

Just prior or at substantially the same time as the actions just described, the dog 178 carried by the shutter curtain rewind gear 167 will be engaged by the shutter latch or release member 177, thus holding the shutter curtain rewind gear in the position shown in Figs. 10 and 16. However, the capping curtain gear 155a and the capping curtain roll 133 will be allowed to turn under the influence of the capping curtain take-up roll 134, inasmuch as the gear 216 has been disconnected from the capping curtain rewind gear 155a. When the capping curtain reaches its run-down position shown in Fig. 8, it will be stopped from further rotation by the stop block 173 and the capping curtain gear stop or knock-out cam 161.

As the shutter rewind gear 156a approaches the limit of its rotation, the pin 164 of the shutter curtain rewind gear 156a will act upon the finger 191 of the shutter switch operating bar 188, causing it to be moved to the right, thus operating the switch 192 and causing it to break the circuit to the shutter clutch magnet 226 and to the motors 48 and 49. The shutter will now be in condition for a second exposure and the shutter mechanism will be in the position shown in Figs. 3, 10 and 16.

*Shutter speed changing mechanism*

Reference will now be made particularly to Figs. 3, 4 and 21.

It is often desirable to provide more than one shutter speed when using a curtain having a single fixed aperture, as in the present disclosure of the invention. In accordance with my invention, this result is accomplished by changing the speed of the shutter curtain rewind roll 135 through the use of a retarding mechanism, most clearly shown in Fig. 4. To the lower end of the shaft 140, viewing Fig. 3, is attached the retard ratchet wheel 142, as previously stated, and to the upstanding member 127 of the base plate 126 a plate 236 is fitted by screws 237, 237. Upon said plate 236 is pivotally mounted, by a screw 236a, a pawl or escapement support member 238 carrying an escapement pawl 239 pivoted on a shoulder rivet 240 and free to oscillate thereon. The opposite end of the pawl or escapement support member 238 is provided with a button 241 passing through an opening 242 of the shutter cover 149.

When the mechanism is in the condition shown in Fig. 4, the ratchet wheel 142 will be retarded by the escapement pawl 239 and will cause the shutter curtain to run at a speed that will produce an exposure of 1/500 of a second. When the button 241 is moved in an upward direction to the position shown in Fig. 21, the escapement pawl 239 is withdrawn from engagement with the ratchet wheel 142, thus allowing the shutter curtain rewind roll 135 to run free, and under such condition an exposure speed of 1/1000 of a second will be obtained, as is indicated in Fig. 21.

*Film feed mechanism*

Figure 17:
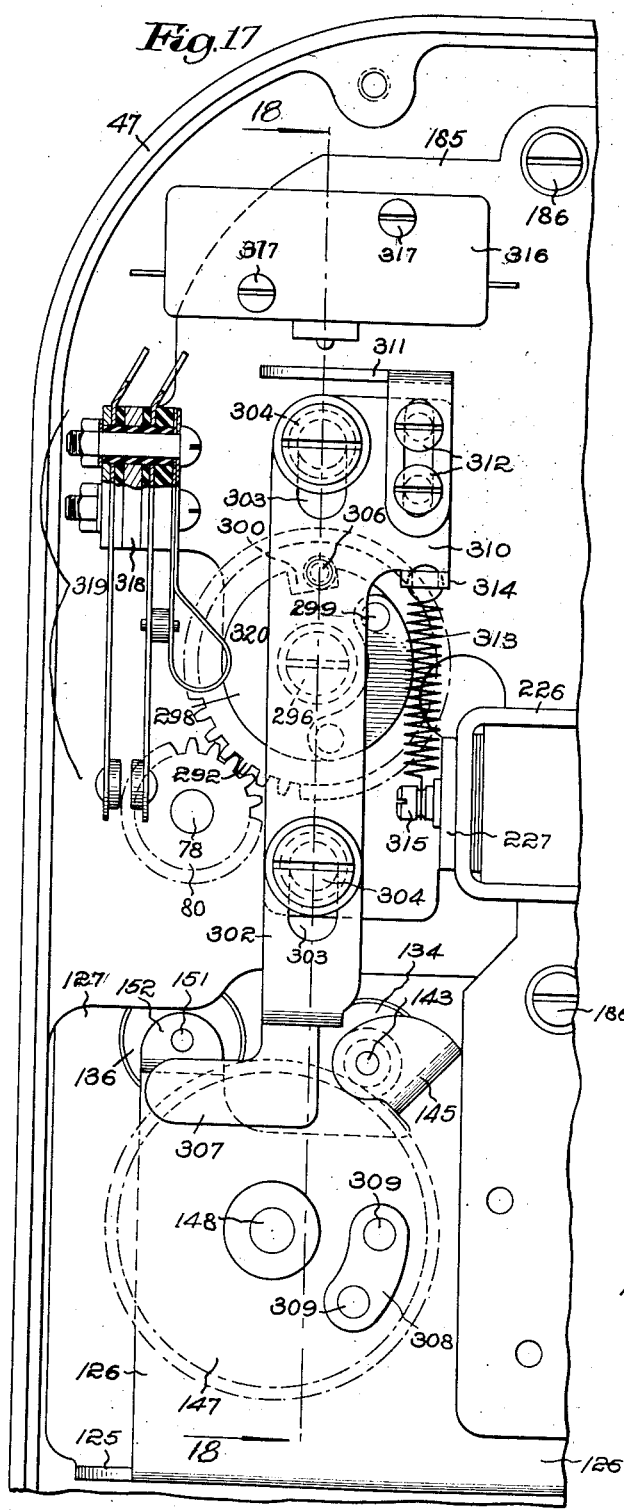
Fig. 17 is an enlarged detail of the left-hand side of Fig. 16, clearly showing the film feed mechanism and the signal light switch.
Figure 18:
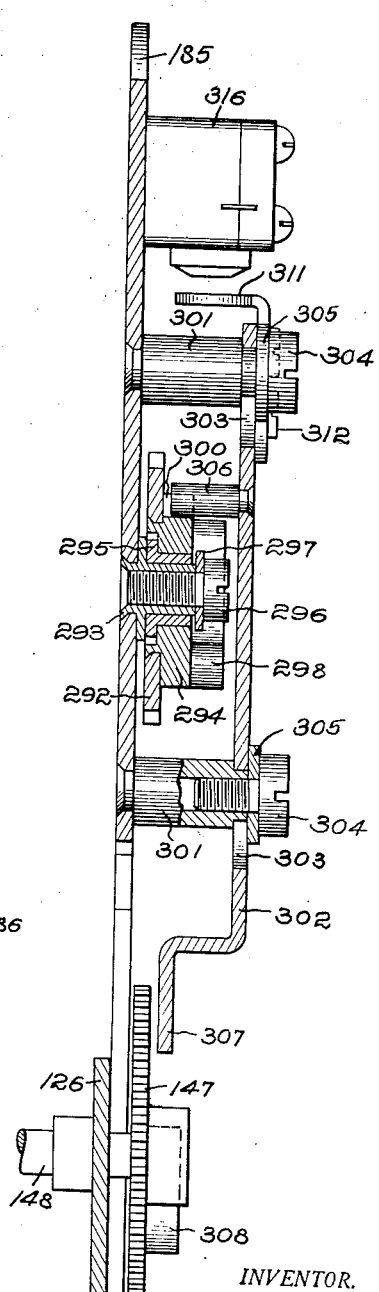
Fig. 18 is a right-hand end view of Fig. 17, being partly in section most clearly to show the construction thereof.

Reference will now be made to Figs. 16 and 17 in describing the film feed mechanism.

There has already been described the film path through the camera from the supply spool 121, over the measuring roll 56, under the pressure pad 68, around the idler roll 57 and onto the take-up roll 123. As shown partially in Fig. 19, to the mechanism plate is attached a bearing sleeve having bushings. Fitted into the said bushings and passing therethrough is a shaft 247 acting as driving means for a gear 249 which has attached thereto a ratchet member 251.

Fitted to the left-hand end of the shaft 247 is a take-up roll driving dog 65, shown in Fig. 2. To an end of a stud 267 is attached a connecting link 269.

As best shown in Fig. 19, a pawl or latch member 273 is attached to the mechanism plate 185 by a large head screw 274. The said pawl or latch member 273 is provided with a laterally extending dog 275 and a terminal finger 276. The pawl member 273 is caused to be moved in a clockwise direction, viewing Fig. 19, by a spring 277, one end of which is hooked to the said pawl member 273 and the opposite end to a pin 278. The said pawl member 273 is caused to be moved in a contraclockwise direction by the said stud 261 in a manner to be fully subsequently described.

Still referring to Fig. 19, there is also attached to the mechanism plate 185 a gear rocker member 279 having an arm 280 that is bent so as to form an armature, as indicated at 281. The said gear rocker member 279 is attached to the mechanism plate 185 by a shoulder rivet 282 which also carries a pinion 283 free to rotate on said shoulder rivet 282, as is also the gear rocker member 279. A pinion 284 is also attached to said gear rocker member 279 by means of a shoulder rivet 285, and a second pinion 286 is also attached to said gear rocker member 279 by a shoulder rivet 287. The said rocker member 279 is caused to be rocked in a contraclockwise direction by a spring 288 and in a clockwise direction by a film clutch magnet 289 which is supported on the mechanism plate 185 by a turned-up arm 290, being held thereto by a screw 291.

The gearing just described, constituting differential mechanism is herein claimed only in combination with the intimately co-operating film-feeding means, shutter releasing means and shutter rewinding means herein disclosed, but in the co-pending application of Louis D. Nadel, filed April 19, 1946, Ser. No. 663,547, now Patent No. 2,495,019, dated January 17, 1950, such differential mechanism is more generically claimed as constituting the means by which the lengthwise tension, imposed by the feeding means upon the film, removes the film pressure pad from contact with the film while the film is being fed.

Operation of the film feed mechanism

When no current is flowing in the film clutch magnet 289 the rocker member 279 will be rocked in contraclockwise direction, pinion 284 will be withdrawn from mesh with the gear 253, and the pinion 286 will be withdrawn from mesh with the pinion 211. When the said film clutch magnet 289 is energized, the rocker member 279 will be rotated in a clockwise direction, engaging pinion 284 and gear 253, pinion 211 and gear 286, all as most clearly shown in Fig. 19. At this time the dog 275 will remain in mesh with the teeth of ratchet 251. When the parts are in the position shown in Fig. 19, the pinion 253 will be caused to rotate in a contraclockwise direction, when the motor is turning in a direction to rewind the shutter. As the said film clutch magnet 289 is energized, it causes the rocker member 279 to rotate clockwise, and thus it engages the gears as just described.

When a tooth of the ratchet wheel 251 is engaged by the dog 275, the gear 284 will be caused to turn in a clockwise direction, thereby turning the gear 253 in a contraclockwise direction. The gear 254 will also be turned in a contraclockwise direction, turning the pinion 262 in a clockwise direction, turning pinion 263 in a contraclockwise direction, and turning gear 249 in a clockwise direction, thereby driving the shaft 247 and the dog 65 in a clockwise direction. The ratchet 251 will also tend to turn in a clockwise direction, but will be prevented from doing so by the dog 275.

Inasmuch as the gear train just described constitutes a differential mechanism, and inasmuch as the gear 249 cannot at this time be turned because of ratchet 251, the entire assembly, excepting the ratchet 251 and the gear 249, will be caused to turn in a contraclockwise direction, thus causing the arm 265 also to be turned in a contraclockwise direction, moving with it the said connecting link 269, the crank 271 and the pressure pad operating shaft 67, thereby raising the pressure pad 68 from contact with the film 75. At the same time the stud 261 will strike the finger 276 of the pawl 273, thereby causing it to rotate in a contraclockwise direction, thus disengaging the dog 275 from the teeth of the ratchet 251. The film spool will now be caused to turn through the shaft 247 connected to the gear 249 which will now be allowed to turn, thus winding the film onto the take-up spool 123.

Figure 12:
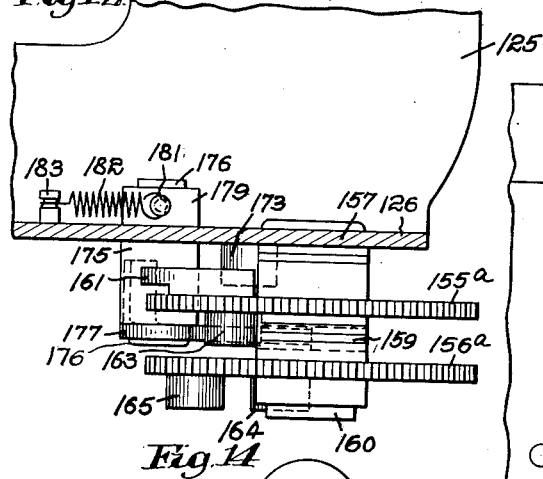
Fig. 12 is a top plan view of Fig. 10, with some of the parts removed to show the construction of the curtain rewind gears.
Figures 14, 15:
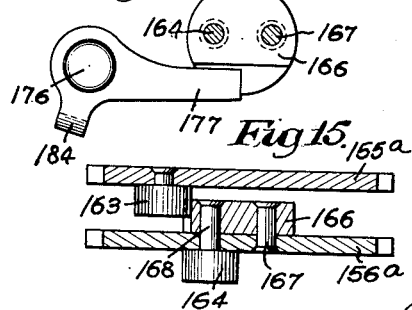
Fig. 14 is a detail of the shutter release lever and the shutter rewind gear dog.
Fig. 15 is a horizontal section of Fig. 10, taken on line 15—15 of Fig. 10, to show the driving connection between the capping curtain rewind gear and the shutter curtain rewind gear.
Figure 13:
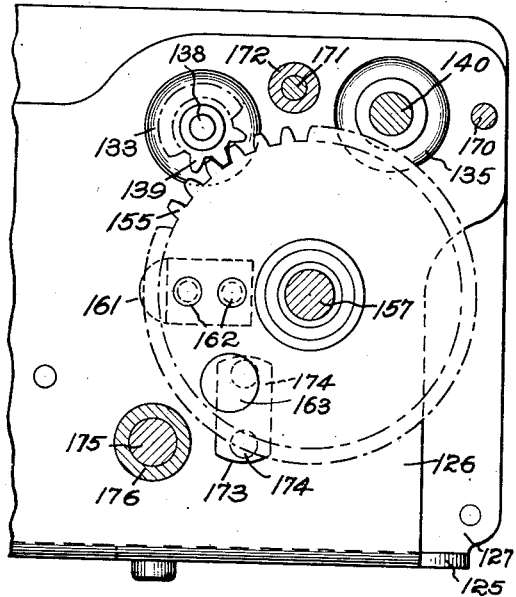
Fig. 13 is a view similar to Fig. 10, with the curtain rewind gear and pinion removed so as more clearly to show the structure of the capping curtain rewind mechanism.

Referring to Figs. 2, 16, 17 and 18, as film is wound on the take-up spool 123, it will be pulled over the measuring roll 56, and as said measuring roll is turned, the shaft 78 and pinion 80 will also be turned, since the pinion 80 meshes with a gear 292, shown in Figs. 12 and 14, and is attached to the mechanism plate 185 by a stud 293. The said gear 292 is provided with a hub 294 attached to the gear 292, and fitted into the hub 294 is a bushing 295 riding on the stud 293. The assembly, consisting of the gear 292 and the bushing 294, is held to the stud 293 by a large head screw 296 and a washer 297. Also a cam 298 is attached to the said hub 294 by rivets 299, 299 and said hub is provided with a notch 300, subsequently referred to.

Also attached to the mechanism plate 185 and spaced therefrom by spacing studs 301, 301 is a switch operating bar 302 provided with elongated openings 303, 303, and held to said spacing studs 301 by large head screws 304, 304 and washers 305, 305. Permanently secured to the said switch operating bar 302 is a timing pin 306. The lower end of said switch operating bar 302 is provided with a reverse L-shaped formation 307, best shown in Fig. 17, that is acted on by a cam block 308 attached to the capping curtain gear 147 by rivets 309, 309. The upper end of the said switch operating bar 302 is provided with a right-hand extension 310, most clearly shown in Fig. 17, and attached to which is an adjustable switch operating member 311 by screws 312, 312.

The said switch operating bar 302 is caused to be moved in a downward direction by a spring 313, one end whereof is hooked to an upturned end 314 of said right-handed extension 310. The opposite end of said spring 313 is hooked to a pin 315 threaded into the upstanding ear or member 227 of the mechanism plate 185. To the said mechanism plate 185 is also attached a film clutch switch 316 by screws 317, 317. The said mechanism plate 185 is provided with an upright extension 318, Fig. 17, to which is attached a signal switch 319 and which is provided with a loop-shaped operating member 320 that is acted upon by the said cam 298.

I will again refer to the just described mechanism when giving a résumé of the complete operation of the camera.

There will next be described the several interlocks including the circuit diagram, and in so doing reference will be made to Figs. 1, 3 and 20 to 22.

Interlocks, circuit control and counter mechanism

As previously stated, the shutter mechanism is readily removed from the camera body 20 as a unit, and when removed appears as shown in Fig. 11. In Fig. 5 is a fragmentary showing of the shutter unit in place in the camera. In order to lock the shutter unit securely in position in the camera, there is provided a lock having a shutter operating handle 321, shown in Figs. 5, 21 and 22. In Fig. 5, the shutter unit operating handle 321 is shown in an upstanding or operating position, and in a folded position in Figs. 21 and 22, being also shown in its operating position in dotted lines, Fig. 22. The said shutter handle 321 is pivoted to a stud 322, Fig. 22, by a pin 323. The said stud 322 is fitted into a suitable bushing 324 of the previously described shutter upright member 127.

Attached to the right-hand end of the stud 322 is a locking member 325 held to the stud 322 by a lock washer 326 and a nut 327, and attached to the said locking member 325 is a shoulder stud 328 held thereto by a nut 329 and fitted to the reduced diameter of the said shoulder stud 328 is an arm 330. The inner end of the shoulder stud 328, being the left-hand end thereof viewing Fig. 22, forms a detent 331 engaged by a detent spring 332 when the locking member 325 is in locked condition.

Fitted to the upper wall 333 of the camera body 20 is a latch plate 334, and fitted to the lower wall 335 of the camera body is a second latch plate 336. The said latch plate 334 is held in place by rivets 337, 337, and the latch plate 336 is held in place by rivets 338, 338. When the handle 321 is in the operating position shown in Fig. 5, the locking member 325 is disengaged from the latch plates 334 and 336. The entire shutter unit or assembly can then be removed by sliding it from the camera body. When the handle 321 is in the position shown in Fig. 21 and full lines in Fig. 22, the locking member 325 engages the latch plates 334 and 336, thus securely locking the shutter unit in place in the camera casing. The arm 330 is provided with a flat hook-like formation 339, shown in dotted lines in Figs. 5 and 21, and it is held in position and guided by studs 340 and 341, most clearly shown in Fig. 5.

Referring now more especially to Fig. 3, pivotally attached to the shutter base plate 125 is a switch operating arm 342, being pivoted on a shoulder stud 343 and held thereto by a retaining screw 34a. The said switch operating bar 342 is provided with a projecting finger 344 for engaging the switch operating button 345 of the safety switch 37. The opposite or left-hand end of the switch operating arm 342 is provided with a hook-like formation 346 engaged by the hook-like formation 339 of the arm 330 when the shutter lock member 321 is turned to the unlocked condition shown in Fig. 5.

This will cause the circuit through the said safety switch 37 to be broken, thus interrupting the circuit through that safety switch, and inasmuch as the said safety switch 37 is in the main camera circuit, the camera will be rendered inoperative when the circuit is in the interrupted condition. As the lock handle 321 is turned in a contraclockwise direction, viewing Fig. 21, the arm 330 will be moved to the right, thus allowing the switch operating arm 342 to be moved in a downward direction by spring 347, one end of which is fixed to the said switch operating arm 342 and the opposite end thereof to a pin 348 securely attached to the shutter base member 125.

Also attached to the upstanding wall or member 127 of the base plate 125 of the shutter unit is a pin 349 acting as a stop for the shutter lock member 325 when the latter is turned in a contraclockwise direction to lock the camera shutter unit in place in the camera casing. When in this condition, the circuit to the said safety switch is completed and the camera can then be operated. Also attached to the cover plate 149 by means of screws 350, 350 is the counter 153 previously referred to.

Attached to the right-hand end of the said counter 153, viewing Fig. 5, is a counter operating member 351. Attached to the shaft 148, as shown in dotted lines in Fig. 1, is a bell crank member having attached thereto a counter operating finger 355 that acts upon the counter operating member 351 each time the shutter is operated, thus providing accurate means for counting the number of exposures made by the camera. The opposite end of the said bell crank latch member 354 is provided with a hook-like member 356 engaged by the hook-like formation 339 of the arm 330 when the shutter lock is in the unlocked condition shown in Fig. 5.

The purpose of this arrangement is to cause the said shaft 148 to be rotated slightly clockwise, viewing Fig. 5, thereby to move the cam block 308 out of engagement with the switch operating bar 302, as shown in Fig. 17, when the shutter unit is in the unlocked condition in the shutter casing, since if this were not done, it would be impossible properly to put the shutter in operating position in the camera casing, inasmuch as the reverse L formation 307 would interfere with the cam block 308. Therefore, the said cam block 308 is moved out of position sufficiently far so that it will not be interfered with by the said reverse L formation 307. The shutter unit can then be moved to the operating position and, when locked in place in the camera casing, the shaft 148 will be allowed to rotate into its normal position.

Camera electrical circuit

Figure 20:
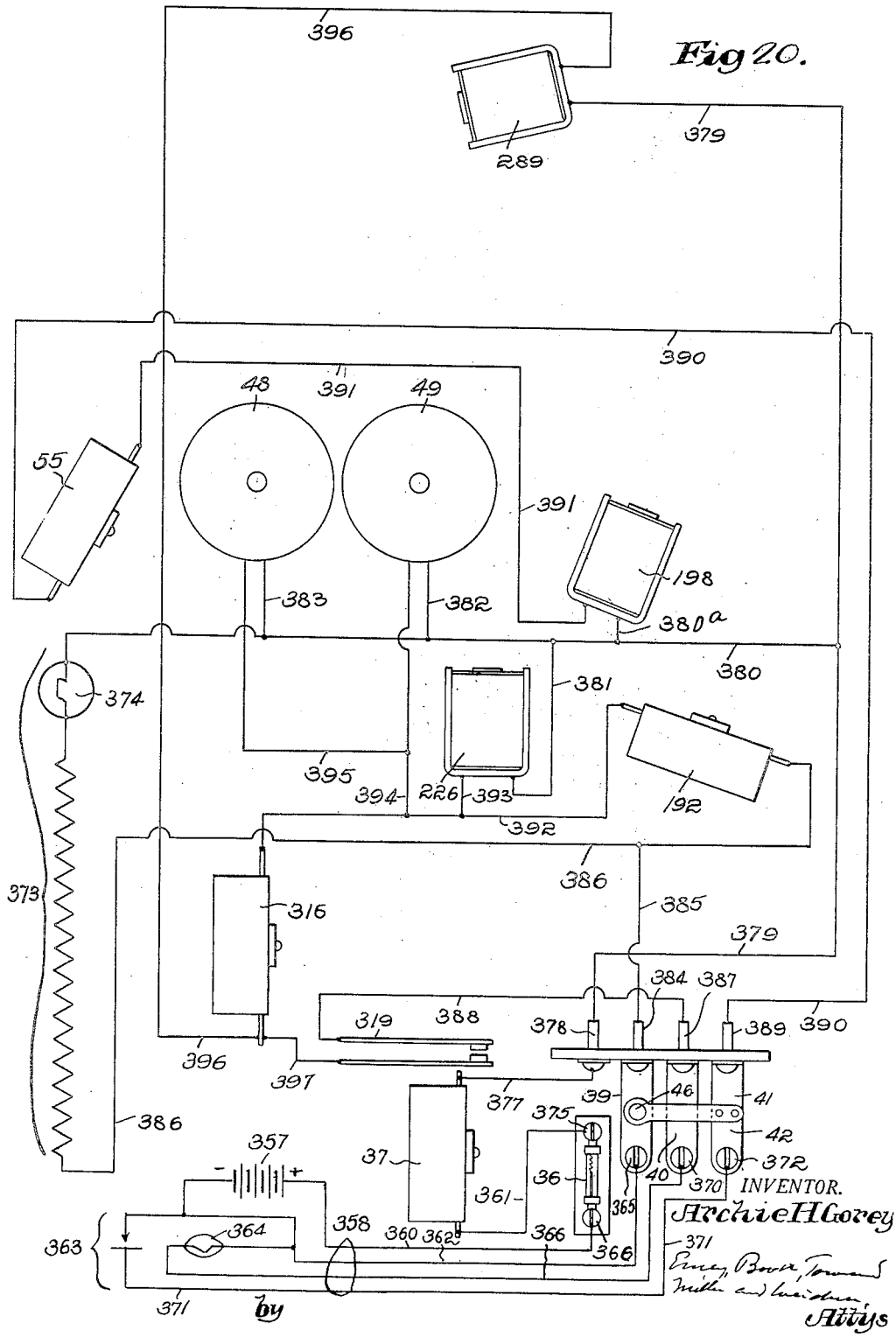
Fig. 20 is a wiring diagram of the camera.

In Fig. 20 is shown a circuit diagram of the camera and its operating connections.

The battery supplying the electrical current to the camera is shown at 357, and a cable is represented at 358 connected with the camera body 20 by means of a strap 359 and terminating in the junction box 33. The cable 358 is made up of four wires, of which the wire 360 connects with the positive terminal of the battery 357. The opposite end of said wire 360 is connected to a screw 361 of the fuse 36. A second wire 362 of the cable 358 is connected with the negative side of the battery 357 and also with one side of the operating switch 363 and a signal lamp 364. The said wire 362 is connected at its opposite end with a terminal screw 365 of the bus bar 39. A third wire 366 of the cable 358 has one end connected to the signal lamp 364 and the opposite end to a screw 370 of the bus bar 40. The fourth wire 371 of the cable 358 is connected at one end with the operating switch 363 and at its opposite end to a terminal screw 372 of the bus-bar 41.

Also shown in the circuit diagram is a heater 373 having a thermostat control 374 to provide normal operating temperature in the camera at all times. This heater, per se, is not a part of the present invention and is not claimed herein.

Connecting with the terminal screw 375 of the fuse 36 is a wire 376, the opposite end whereof is connected to the terminal on the safety switch 37. To the opposite side of the said safety switch is connected a wire 377, the opposite end whereof is connected to a terminal 378, connected to which is a wire 379 connecting to the film feed solenoid 289. Connected to the said wire 379 is a wire 380 connected to the shutter trip magnet 198 through a short wire 380a and to the shutter clutch magnet 226 through a short wire 381, and to the motor 49 through a short wire 382 and also to the motor 48 through a short wire 383. The wire 380 is also connected with the thermostat 374.

Connected with the terminal 384 is a wire 385 connected to a wire 386, one end of which is connected to the shutter switch 192 and the opposite end is connected to the heater resistance 373. Connected to the terminal 387 is a wire 388 that is itself connected to the signal switch 319. Connected to the terminal 389 is a wire 390 that is connected to one end of the film switch 55. The opposite end of the said film switch has a wire 391 connected to the shutter switch magnet 198. Connected to the shutter switch 192 is a wire 392 that is connected to one terminal of the film clutch switch 316, and said switch and the wire 392 are also connected with the shutter clutch magnet 326 through a short wire 393, and to the motors 48 and 49 through wires 394 and 395. The film feed magnet 289 has a wire 396 connected thereto, the opposite end of which wire is connected to the film clutch switch 316. Connecting the said switch 316 and one end of the signal switch 319 is a short wire 397.

The operation of the camera mechanism

The operation of the camera mechanism will next be described, and in so doing reference will be made particularly to Figs. 16 and 17.

In the position of the parts shown in Fig. 16, the camera is ready for making an exposure, it having previously been loaded with film, and inasmuch as the camera automatically recycles after each exposure, it will thus be placed in condition for making a second exposure. The safety switch 37 is in closed position. The end of the film switch 55 will also be in a closed position because the cam block 308 contacts with the L-shaped member 307 of the switch bar 302. This always occurs when the capping curtain has run down, as it does just before the camera reaches a point wherein the shutter curtain is in a set condition for a second exposure. The pin 306 has been withdrawn from the notch 300 of the hub 298 and the switch 192 is in open condition. Therefore, no current is flowing to the solenoid 226 or the solenoid 289. The switch 363 is also in open condition and no current is flowing to the solenoid 198.

When now the circuit is closed to the switch 363, the solenoid magnet 198 will be energized, moving the armature 207 to the left, viewing Fig. 16, thus operating the shutter release lever 177, allowing the shutter rewind gear 156a, pinion 141 and shutter curtain roll 135 to rotate, thus allowing the curtain aperture 132 to travel across the exposure opening of the camera, thereby making an exposure.

As the said shutter rewind gear 156a reaches the end of its travel, the pin 164 will contact with the finger 191 of the arm 88, causing it to be moved to the left, thereby closing a circuit in the switch 192, and said switch will complete a circuit in the shutter rewind magnet 226 and will complete the circuit to the film clutch magnet 289 and also to the motors 48 and 49. The shutter rewind gear 216 will then engage the capping curtain gear 155a, turning it in a contraclockwise direction, thereby rewinding the capping curtain 130 onto the capping curtain roll 133. The shutter curtain gear 156a will also be turned in a contraclockwise direction, since the drive pin 163 attached to the said capping curtain gear 155a will contact the drive member 166 attached to the shutter curtain gear 156a, thus turning the pinion 141 and the shutter rewind roll 135, thus causing the shutter curtain 129 to be rewound on the roll 135. At the same time, the armature 281 will be attracted to the magnet 289, thereby turning the rocker arm 279 clockwise, thus engaging pinions 211, 286 and 284 and the film rewind gear 253.

Film will now be wound on the spool 123 as described, and when sufficient film has been wound onto the spool 123, so as to provide for making the second exposure, the gear 292 will be turned through the pinion 80 attached to the shaft 78 of the measuring roll 56 so as to allow the notch 300 to be in position for the pin 306 of the switch bar 302 to drop thereinto. It will be noted that at this time the cam block 308 of the gear 147 will be in a position that does not interfere with the reverse L-shaped lever 307 of the switch bar 302 as the gear 147 is connected to the shutter curtain previously described, and since the capping curtain has not as yet been released from the cam 308, said cam 308 will be in the position shown in Fig. 17. When the switch bar 302 moves downwardly the clutch switch 316 will interrupt the circuit to the magnet 289, thus releasing the armature 281 and allowing the pinions 284, 253, 211 and 286 to be disengaged. This will stop all winding of the film for the time being, and since there is no longer any driving effort on the gear 253, the arm 265 will be rotated clockwise by pressure pad springs 70, 71, thus causing the pressure pad 68 to contact with the film 75 and hold it firmly in place.

At the time the film started, as previously stated, to wind on the film spool 123, the arm 265 of the differential winding mechanism was caused to move in a contraclockwise direction so as to raise the pressure pad 68 as described. The gearing is so arranged that a sufficient length of film will always be wound on the spool 123 before the shutter curtains are fully rewound.

Therefore the motors 48 and 49 will continue to rotate after the switch 316 has been opened, and current will continue to flow in the magnet 226 until the shutter rewind gear 156a reaches the position shown in Fig. 16, wherein the switch operating bar 188 is moved to the right by the pin 164, thus opening a circuit through the switch 192. This will break the circuit to the magnet 226 and will allow the rocker arm 209 to turn in a clockwise direction, thereby disengaging the gears 216 and 155a. At this time the circuit will be broken to the motors 48 and 49 and at the same time the bell crank end 220 will have been acted upon by the cam block 161 carried by the shutter rewind gear 152a, so as to force the gear 216 out of mesh with the shutter rewind gear 155a.

At this time the capping curtain roller will be allowed to turn, but allowing the capping curtain to run back, thereby uncapping the exposure opening, and the gear 147 will be rotated to allow the cam block 308 to act upon the reverse L-shape end 307 of the switch bar 302, so as again to close the circuit through the switch 316 and to remove the pin 306 from the notch 300. The switch 316 will not cause the circuit again to be made to the magnet 309 until the switch 192 is also closed. As the gear 292 rotates, the cam 298 will also rotate, thereby making one revolution for a camera cycle.

As the said cam 298 passes the loop 320 of the switch 319 a contact will be made, thus completing a circuit to the signal lamp 364, thereby causing it to be flashed once for each revolution of the gear 292. As the shutter rewind gear 156a is stopped through the operation of the switch 192, it will be prevented from turning in a clockwise direction by the shutter latch member 177, as fully described. The camera is now ready for a second exposure.

The removable shutter unit or assembly

I have described the shutter unit or assembly as insertible into and removable from the camera casing as a unit. This feature has numerous advantages among which are ready accessibility to the shutter mechanism for the purpose of making repairs or for the substitution of a different shutter unit and also simplicity of construction of the entire camera and also facilitating the assemblage of the parts of the camera when building the same.

Referring particularly to dotted lines in Fig. 1 and to Figs. 2, 3, 5 and 22, it will be understood that a lateral wall of the shutter casing, being the left-hand wall viewing Fig. 1, has an opening therein, into or through which the shutter unit or assembly is slid into position. Viewing Fig. 2, showing among other parts the shutter unit in transverse section, it will be evident that the said unit is removed from the camera casing by sliding it toward the observer viewing said figure; that is to say, the said shutter unit is slid, in order to withdraw it from the camera casing, in a direction which is downward in Fig. 3, and which is toward the left viewing Fig. 22, wherein are best shown two inner walls of the camera casing 333 and 335, which respectively have the latch plates 334 and 336 secured to their inner faces to receive the ends of the locking member 325 after the shutter unit has been slid inward (i. e. toward the right viewing Fig. 22). When the shutter unit has been slid into its functioning position, the locking member 325 is turned into the position shown in Fig. 22 by movement of the operating handle 321, so as to engage the upper and lower ends of the locking member 325 with the latch plates 334 and 336.

As clearly described, the shutter unit or assembly is made up of the base plate 125 and the two upstanding end members 126 and 127 of which the member 127 is shown in Fig. 22. All the parts of the shutter unit are received by and supported upon the said base plate 125 and the two upstanding end members 126 and 127. So far as I am aware, it is broadly new to provide a shutter unit or assembly readily removable from within the camera casing without disturbing the other parts of the camera, and this matter is claimed broadly by me in a divisional application. The shutter which comprises the main or essential part of the said removable unit or assembly is a focal plane shutter consisting of an aperture or shutter curtain and a capping curtain, and the camera which is so equipped with a removable shutter unit or assembly is an automatic motor driven camera preferably adapted for making aerial photographs.

*Brief résumé respecting the shutter operation*

It will be evident from the foregoing description that the entire shutter operation is electrically controlled. Assuming the shutter to be rewound at the beginning of the new cycle, or as a preliminary thereto at the termination of the preceding cycle, the capping curtain 128 has run down to open condition.

Current is supplied to the shutter release magnet 198, causing the armature 207 to move the shutter release bar 201 having the hook 208. This causes the shutter release pawl 177 to be disengaged from the dog 178, allowing the shutter curtain rewind gear 156a to turn clockwise. The pinion 141 and the shutter curtain roll 135 will be turned contraclockwise, allowing the shutter curtain to travel and an exposure to be made. The shutter curtain rewind gear 156a will now be stopped from further rotation, since curtain rewind drive member 166 engages the rewind pin 163 on the capping curtain rewind gear 155a.

In rewinding, the finger 191 of the switch bar 188 is moved to the left, operating the shutter rewind switch 192. This causes current to flow in the shutter rewind clutch member 226, moving the armature 225 and the connecting link 221 to the left, thereby turning bell crank lever 209 contraclockwise, thus engaging the large idler gear 216 on the bell crank lever 209 and the capping curtain gear 155a. The motors 48 and 49 are also energized, and through the gearing, fully described, cause the capping curtain rewind gear 155a to turn contraclockwise. The capping curtain roll 133 now begins to rotate through the action of the capping curtain rewind gear 155a. The rewind gear 156a of the shutter curtain also rotates contraclockwise because the pin 163 on the capping curtain rewind gear 155a engages curtain rewind drive member 166 on the said rewind gear 156a. Therefore, both curtains will be fully rewound.

Just before both curtains are fully rewound, the knockout cam 161 acts on the end 220 of the bell crank lever 209, causing its idler gear 216 to be disengaged from the capping curtain rewind gear 155a. At substantially the same time, the dog 178 on the rewind gear 167 is engaged by the shutter release pawl 177, thus holding the shutter curtain rewind gear in position, but the capping curtain rewind gear 155a and the roll 133 are allowed to be turned by the capping curtain take-up roll 134, inasmuch as the said idler gear 216 has been disconnected from the rewind gear 155a.

When the capping curtain reaches run-down position, it is stopped by the stop block 173 and the knock-out cam 161. As the shutter curtain rewind gear 156a nears the end of its rotative movement, the pin 164 of the shutter curtain rewind gear 156a acts on the finger 191 of the switch bar 188, moving it to the right, thus operating the switch 192 to break the circuit to the clutch magnet 226 and to the electric motors 48, 49.

The shutter is now in condition for a second exposure.

*The co-relation of the film feed and the shutter operation*

The means for feeding the film and the means for operating the shutter are intimately cooperative. Both of the said mechanisms are electrically controlled. When the circuit is closed at the main switch 363, the solenoid magnet 198 sets in operation the shutter release mechanism, allowing the curtain aperture 132 of the shutter curtain to travel across the exposure opening of the camera, thus making an exposure. Thereupon the circuit is closed in switch 192, thereby completing a circuit through the shutter rewind magnet 226, energizing the film clutch magnet 289 and the motors 48 and 49. The capping curtain 130 is then rewound onto the capping curtain roll 133, and the shutter rewind roll 135 is turned, causing the shutter curtain 129 to be rewound on its roll 135.

Further film is now wound on spool 123, and when sufficient film has been so wound for making the second exposure, through the described action of the switch bar 302 and the parts immediately cooperating therewith, the clutch switch 316 will interrupt the circuit to the magnet 289, thus releasing the armature 281, disengaging the described gears and stopping all further winding of the film. Thereupon the pressure pad 68 is caused to contact with the film 75 and hold it firmly in place. When the film is again to be wound on the film spool 123, the pressure pad is raised from the film, and sufficient film for a new exposure is wound on spool 123 before the shutter curtains are fully rewound.

After the switch 316 has been opened, current continues to flow in the magnet 226 until the switch operating bar 188 is moved to the right by pin 164, thereby opening a circuit through switch 192 and breaking the circuit to magnet 226 and breaking the circuit to the motors 48, 49.

The capping curtain roll is allowed to turn, permitting the capping curtain to run back, thus uncapping the exposure opening, and in the further operation the switch bar 302 again closes the circuit through the switch 316, but not completing a circuit to the magnet 209 until the switch 192 is also closed.

The cam 298 makes one rotation for each camera cycle, and in its movement completes a circuit to the signal light 364, thus causing it to be flashed once for each revolution of gear 292.

Thus, it will be seen that there is an intimate cooperation between the film feeding means and the shutter operating and the shutter rewinding means.

The camera is fully automatic and capable of a very high rate of speed of the exposure cycles. With a film five inches in width and making an exposure five inches long, it has been possible with the camera to make exposures as rapidly as four per second, and inasmuch as no part of a cycle of the camera can take place until the preceding part of the cycle has been completed, the camera is absolutely foolproof. The film winding cannot commence until the exposure cycle takes place, nor can an exposure cycle take place until the film has been completely rewound. The camera is very simple in construction and is relatively inexpensive to manufacture, particularly in quantities.

Having thus described one illustrative embodiment of the invention, it is to be understood that although specific terms are employed, they are used in a descriptive and generic sense and not for purposes of limitation, the scope of the invention being set forth in the following claims.

I claim:

1. In a photographic camera, a focal plane shutter comprising a shutter curtain having a single aperture therein, providing an unvarying exposure opening, and also comprising a capping curtain mounted in close parallelism with said shutter curtain, rewind gears for said curtains respectively, electric wiring in said camera providing an electrical circuit, an electric motor in said circuit, a shutter rewind electric switch in said circuit, a switch-operating lengthwise-movable bar, a formation upon one of said rewind gears to move said bar in one lengthwise direction, thereby closing said shutter rewind electric switch, a formation upon one of said rewind gears to move said bar in the opposite lengthwise direction, thereby opening said shutter rewind electric switch, a solenoid magnet in said circuit, an adjacent bar-like lengthwise-movable member having an armature, means acted upon by lengthwise movement of said bar-like member, when said solenoid magnet is energized, to release the shutter for running down, and means cooperating with said rewind gears for rewinding both of said curtains.

2. In a photographic camera, a focal plane shutter comprising a shutter curtain having a single aperture therein, providing an unvarying exposure opening, and also comprising a capping curtain mounted in close parallelism with said shutter curtain, rewind gears for said curtains respectively, electric wiring in said camera providing an electrical circuit, an electric motor in said circuit, a shutter rewind electric switch in said circuit, a switch-operating lengthwise-movable bar, a formation upon one of said rewind gears to move said bar in one lengthwise direction, thereby closing said shutter rewind electric switch, a formation upon one of said rewind gears to move said bar in the opposite lengthwise direction, thereby opening said shutter rewind electric switch, a solenoid magnet in said circuit, an adjacent bar-like lengthwise-movable member having an armature, means acted upon by lengthwise movement of said bar-like member, when said solenoid magnet is energized, to release the shutter for running down, said means cooperating with said rewind gears for rewinding said curtains including a shutter rewind clutch magnet in said circuit, and a movable member carrying an armature and operatively connected with said rewind gears and moved upon energization of said shutter rewind clutch magnet.

3. In a photographic camera, a focal plane shutter comprising a shutter curtain having a single aperture therein, providing an unvarying exposure, and also comprising a capping curtain mounted in close parallelism with said shutter curtain, rewind gears for said curtains respectively, electric wiring in said camera providing an electrical circuit, an electric motor in said circuit, a shutter rewind electric switch in said circuit, a switch-operating lengthwise-movable bar, a formation upon one of said rewind gears to move said bar in one lengthwise direction, thereby closing said shutter rewind electric switch, a formation upon one of said rewind gears to move said bar in the opposite lengthwise direction, thereby opening said shutter rewind electric switch, a solenoid magnet in said circuit, an adjacent bar-like lengthwise-movable member having an armature, means acted upon by lengthwise movement of said bar-like member, when said solenoid magnet is energized, to release the shutter for running down, a shutter rewind clutch magnet and an adjacent armature, a link connected to said armature, a lever connected to said link, a gear carried by said lever and adapted, when said lever is moved by energization of said shutter rewind clutch magnet, to be brought into mesh with one of said rewind gears for rewinding the curtains, and a main drive gear having meshing relation with said electric motor.

4. Focal plane shutter operating means in accordance with claim 1, wherein, in cooperation with the said switch-operating lengthwise-movable bar, there is provided a spring detent 196 positioned to engage and thereby to impart resistance to the movement of said bar.

5. In a photographic camera, a focal plane shutter comprising a shutter curtain having a single aperture therein providing an unvarying exposure opening and also comprising a capping curtain mounted in close parallelism with said shutter curtain, electric wiring providing an electrical circuit, a shutter rewind clutch magnet 226 in said circuit for the said winding of the shutter and an armature 225 adjacent thereto and moved thereby, a lengthwise movable link 221 connected to said armature, a bell crank lever 209 connected to said link, a gear 216 on said bell crank lever, a capping curtain rewind gear 155a meshing with said gear 216 when the shutter is being rewound upon energization of said magnet 226 and consequent movement of said bell crank lever 209, electric motor means in said circuit, and gearing operated by said motor means, said motor means, when energized, acting through said gearing to cause the capping curtain rewind gear 155a to turn in a shutter rewinding direction, a capping curtain take-up roll 133 turned in a curtain rewinding direction by rotative movement of the capping curtain rewind gear 155a, the shutter curtain having a rewind gear 156a, the capping curtain rewind gear 155a having a laterally projecting pin 163 and the said rewind gear 156a having a laterally projecting rewind member 166 to be engaged by said pin 163, whereby both curtains are fully rewound, and a shutter release pawl 177 cooperating with said rewind member 166 and which, at substantially the same time that both curtains are fully rewound, will hold the shutter rewind gears in position, the capping curtain having said rewind gear 155a and the curtain roll 133 being permitted to be turned by the capping curtain take-up roll upon disengagement of the gear 216 on the bell crank lever 209 from the said capping curtain rewind gear 155a.

6. In a photographic camera, a focal plane shutter comprising a shutter curtain having a single aperture therein providing an unvarying exposure opening and also comprising a capping curtain mounted in close parallelism with said shutter curtain, electric wiring providing an electrical circuit, a shutter rewind clutch magnet 226 in said circuit and an armature 225 moved thereby, a lengthwise movable link 221 connected to said armature, a bell crank lever 209 connected to said link, a gear 216 on said bell crank lever, a capping curtain rewind gear 155a positioned to be rotated by said gear 216 upon the movement of said bell crank lever by said link 221, electric motor means in said circuit, and gearing operated by said motor means, said motor means acting, when energized, through said gearing to cause the capping curtain rewind gear 155a to turn in a shutter rewinding direction, a capping curtain take-up roll 133 turned in a curtain rewinding direction by rotative movement of the capping curtain rewind gear 155a, the shutter curtain having a rewind gear 156a, the capping curtain rewind gear 155a having a laterally projecting pin 163 and the said rewind gear 156a having a laterally projecting rewind member 166 to be engaged by said pin 163, whereby both curtains are fully rewound, a stop plate 173 on the shutter housing and a knock-out cam 161 on the capping curtain rewind gear 155a to stop the capping curtain when it reaches its run-down position.

7. In a photographic camera, a focal plane shutter comprising a shutter curtain having a single aperture therein providing an unvarying exposure opening and also comprising a capping curtain mounted in close parallelism with said shutter curtain, electric wiring providing an electrical circuit, a shutter rewind clutch magnet 226 in said circuit and an armature 225 moved thereby, a lengthwise movable link 221 connected to said armature, a bell crank lever 209 connected to said link, a gear 216 on said bell crank lever, a capping curtain gear 155a positioned to be rotated by said gear 216 upon movement of said bell crank lever by said link 221, electric motor means in said circuit, and gearing operated by said motor means, said motor means acting, when energized, through said gearing to cause the capping curtain rewind gear 155a to turn in a shutter rewinding direction, a capping curtain take-up roll 133 turned in a curtain rewinding direction by rotative movement of the capping curtain rewind gear 155a, the shutter curtain having a rewind gear 156a rotated in a curtain rewinding direction in the shutter rewinding movement, the capping curtain rewind gear 155a having a pin 163 and the said rewind gear 156a having a rewind member 166 to be engaged by said pin 163, whereby both curtains are fully rewound, the rewind gear 156a having a pin 164, a switch-operating lengthwise movable bar 188 having a finger 191 and a switch 192 in said electrical circuit, whereby as the shutter rewind gear 156a nears the end of its rotation, the pin 164 of the rewind gear 156a acts on the finger 191 of said switch operating bar 188 to move it lengthwise, thereby operating the switch 192 to break the circuit to the clutch magnet 226, and to the electric motor means, thus placing the shutter mechanism in condition for a second exposure.

8. In a photographic camera, focal plane shutter operating mechanism, a shutter curtain having a single aperture therein, a capping curtain mounted in close parallelism with said shutter curtain, both of said curtains having winding gears, and electrical means carried by the camera and constituting operating means for said curtains and operatively connected with and cooperating with said curtains to produce all the movements of said curtains, namely, winding the capping curtain into capping position, then winding both of said curtains into fully rewound condition, then releasing the capping curtain, thus allowing it to run back to uncap the exposure opening, and then releasing the shutter curtain to make the exposure, said electrical operating means including an electric circuit, said electrical operating means also including a shutter release magnet 198, an armature 207 movable thereby, a shutter-release lengthwise-movable bar 201 carrying said armature, and shutter release means acted on by said bar 201 to allow the capping curtain to run back to uncap the exposure opening and the shutter curtain to run down to make the exposure, said electrical operating means also including a bar 188 moved lengthwise by the running-down movement of the shutter and a rewind switch 192 operated by lengthwise movement of said bar 188 to operate the capping curtain, said electrical operating means also including a solenoid clutch magnet 226, an armature 225 moved thereby, and means moved by the armature to operate the capping curtain winding gear, and also including motor means and gearing therefrom fully to rewind both curtains, whereby the capping curtain is moved into capping position, then both curtains are fully rewound, then the capping curtain is run back to uncap the exposure opening, and then the shutter curtain is released to make the exposure.

9. In a photographic camera, a focal plane shutter comprising a shutter curtain having a single aperture therein, providing an unvarying exposure opening, and also comprising a capping curtain mounted in close parallelism with said shutter curtain, supporting and operating means for said curtains including supporting rolls for said curtains respectively, and a rewind gear 155a for said capping curtain and a rewind gear 156a for said shutter curtain, said capping curtain rewind gear 155a having a projecting driving stud 163, said shutter curtain rewind gear 156a having an electric switch-operating pin 164 and a stop pin 165, a release dog and curtain rewind drive member 166 carried by said shutter curtain rewind gear 156a to engage said driving stud 163, a pivoted shutter latch or release pawl 177 positioned to engage said release dog and curtain rewind drive member 166, a shutter switch-operating bar 188 having a finger 191 to engage said switch-operating pin 164 when the shutter is rewound, said switch-operating pin 164 acting to move said bar 188 in one direction, and said stop pin 165 acting to move said bar 188 in the opposite direction, a shutter rewind electric switch 192 positioned to be closed when said pin 164 moves said bar 188, a solenoid magnet 198, a cooperating bar-like member 201 having an armature 207 to be acted on by said solenoid magnet 198 to move said shutter latch or release pawl 177, thereby to disengage said shutter release dog and curtain rewind drive member 166, thus releasing the shutter, a bell crank 209 having at its pivot a pinion 211 and a gear 212, an idler shutter rewinding gear 216 mounted on one end of said bell crank 209 and positioned to mesh with said pinion 211 on the bell crank 209, and with said capping curtain rewind gear 155a, when the said curtains are being rewound, an armature 225, a link 221 connecting said bell crank 209 with said armature 225, a shutter rewind clutch magnet 226 by which said armature 225 is moved, an idler gear 228 having a pinion 229 meshing with said gear 212 on said bell crank 209, a pinion 231 meshing with said idler gear 228, a main drive gear 232, electric motor means having gearing meshing with said main drive gear 232 and electric wiring in said camera providing a circuit in which are included said magnets, said switch and said electric motor means, whereby, when electrical current is supplied to the shutter release magnet 198 by the closing of the shutter-rewind shutter switch 192, the shutter curtain is released and the curtain aperture thereof travels across the exposure aperture, and after exposure the shutter switch-operating bar 188 will be moved, the shutter rewind switch 192 will be closed, causing current to flow, and the shutter rewind clutch magnet 226 will be energized, thereby moving the adjacent armature 225 and the connecting link 221, and the bell crank 209 will be moved, thereby engaging the idler gear 216 and the capping curtain gear 155a, the electric motor means will be energized and the capping curtain and the shutter curtain will be rewound, then the capping curtain is allowed to run back to uncap the exposure opening, and then the rewind electric switch 192 will be opened, thereby causing it to break the circuit to the shutter rewind clutch magnet 226 and to the said electric motor means, so that the rewound shutter is at such time in condition for a second exposure.

10. In a photographic camera, a focal plane shutter comprising a shutter curtain having a single aperture therein, providing an unvarying exposure opening, and also comprising a capping curtain mounted in close parallelism with said shutter curtain, a rewind gear 155a for the capping curtain, a rewind gear 156a for the shutter curtain, said capping curtain rewind gear 155a having a driving stud 163, said shutter curtain rewind gear 156a having an electric switch-operating pin 164, a release dog and curtain rewind drive member 166 on one of said rewind gears to engage said driving stud 163, latch means to engage said release dog and curtain rewind drive member 166, a shutter switch-operating lengthwise-movable bar 188 having a finger 191 to engage said switch-operating pin 164 when the shutter is rewound, said switch-operating pin 164 acting to move said bar 188 in one lengthwise direction, and said stop pin 165 acting to move said bar 188 in the opposite lengthwise direction, a shutter rewind electric switch 192 positioned to be closed when said pin 164 moves said bar 188, a solenoid magnet 198, a cooperating lengthwise-movable bar-like member 201 having an armature 207 to be acted on by said solenoid magnet 198 to move said shutter latch or release pawl 177, thereby to disengage said shutter release dog and curtain rewind drive member 166, thus releasing the shutter, a bell crank 209 having at its pivot a pinion 211 and a gear 212, an idler shutter-winding gear 216 mounted on one end of said bell crank 209 and positioned to mesh with said pinion 211 on the bell crank 209, and with said capping curtain rewind gear 155a when the said curtains are being rewound, an armature 225, a lengthwise movable link 221 connecting said bell crank 209 with said armature 225, a shutter rewind clutch magnet 226 by which said armature 225 is moved, an idler gear 228 having a pinion 229 meshing with said gear 212 on said bell crank 209, a pinion 231 meshing with said idler gear 228, a main drive gear 232, electric motor means having gearing meshing with said main drive gear 232 and electric wiring providing a circuit in which are included said magnets, said switch and said electric motor means.

11. In a photographic camera, a focal plane shutter comprising a shutter curtain having a single aperture therein, providing an unvarying exposure opening, and also comprising a capping curtain mounted in close parallelism with said shutter curtain, a rewind gear 155a for the capping curtain, a rewind gear 156a for the shutter curtain, said capping curtain rewind gear 155a having a driving stud 163, said shutter curtain rewind gear 156a having an electric switch-operating pin 164, a release dog and curtain rewind drive member 166 on one of said rewind gears to engage said driving stud 163, latch means to engage said release dog and curtain rewind drive member 166, a shutter-operating lengthwise-movable bar 188 to engage said switch operating pin 164 when the shutter is rewound and to be moved by said pin, a shutter rewind electric switch 192 positioned to be closed when said switch-operating lengthwise-movable bar 188 is moved by said operating pin 164, a solenoid magnet 198, an armature 207 adjacent said magnet and movable means carrying said armature and adapted to engage and move said latch means, a shutter rewind clutch magnet 226, an adjacent armature, movable means carrying said armature, a bell crank 209 having a gear 212, and also a shutter rewind gear 216 to mesh with said capping curtain rewind gear 155a, said bell crank 209 being connected to said moveable means carrying the last mentioned armature, electric means having gearing meshing with said main drive gear, and electric wiring providing a circuit in which are included said magnets, said switch and said electric motor means.

12. In a photographic camera, a focal plane shutter comprising a shutter curtain having a single aperture therein, providing an unvarying exposure opening, and also comprising a capping curtain mounted in close parallelism with said shutter curtain, a rewind gear 155a for the capping curtain, a rewind gear 156a for the shutter curtain, said capping curtain rewind gear 155a having a driving stud 163, said shutter curtain rewind gear 156a having an electric switch-operating pin 164, a release dog and curtain rewind drive member 166 on one of said rewind gears, to engage said driving stud 163, latch means to engage said release dog and curtain rewind drive member 166, a lengthwise-movable shutter operating bar 188 to engage said switch operating pin 164 when the shutter is rewound and to be moved by said pin, a shutter rewind electric switch 192 positioned to be closed when said lengthwise-movable switch-operating bar 188 is moved by said operating pin 164, a solenoid magnet 198, an armature adjacent said magnet and movable means carrying said armature and adapted to engage and move said latch means, a shutter rewind clutch magnet 226, an adjacent armature, movable means carrying said armature, a lever having a gear to move with said capping curtain rewind gear 155a, said lever being connected to said movable means carrying the last mentioned armature and an electric circuit having electric motor means and in which circuit are included said magnets and said shutter rewind electric switch.

13. In a photographic camera, a focal plane shutter comprising a shutter curtain having a single aperture therein, providing an unvarying exposure opening, and also comprising a capping curtain mounted in close parallelism with said shutter curtain, rewind gears for said curtains respectively, electric wiring in said camera providing an electrical circuit, an electric motor in said circuit, a shutter rewind electric switch in said circuit, a switch-operating lengthwise-movable bar, a formation upon one of said rewind gears to move said bar in one lengthwise direction, thereby closing said shutter rewind electric switch, a formation upon one of said rewind gears to move said bar in the opposite lengthwise direction, thereby opening said shutter rewind electric switch, a solenoid magnet in said circuit, an adjacent bar-like lengthwise-movable member having an armature, means acted upon by lengthwise movement of said bar-like member, when said solenoid magnet is energized, to release the shutter for running down, and including a mechanism plate 185 mounted upon the camera structure, an idler gear 228 and pinion 229 on said mechanism plate 185, and a main drive gear 232 having a pinion 231, said idler gear 228 meshing with said pinion 231, said electric circuit in said camera having an electric motor 48 having a pinion 234 meshing with the said main drive gear 232, and an electric motor 49 in said electric circuit having a pinion 235 also meshing with said main drive gear 232, said gears and pinions all being in operating driving relation to said shutter.

14. In a photographic camera, a focal plan shutter comprising a shutter curtain having a single aperture therein, providing an unvarying exposure opening, and also comprising a capping curtain mounted in close parallelism with said shutter curtain, rewind gears for said curtains respectively, electric wiring in said camera providing an electrical circuit, an electric motor in said circuit, a shutter rewind electric switch in said circuit, a switch-operating lengthwise-movable bar, a formation upon one of said rewind gears to move said bar in one lengthwise direction, thereby closing said shutter rewind electric switch, a formation upon one of said rewind gears to move said bar in the opposite lengthwise direction, thereby opening said shutter rewind electric switch, a solenoid magnet in said circuit, an adjacent bar-like lengthwise-movable member having an armature, means acted upon by lengthwise movement of said bar-like member, when said solenoid magnet is energized, to release the shutter for running down, said means acted upon by lengthwise movement of said bar-like member, including a release dog and curtain rewind drive member, and a shutter latch or release pawl positioned to engage said release dog and curtain rewind drive member, and means cooperating with said rewind gears for rewinding both of said curtains.

15. In a photographic camera, a focal plane shutter comprising a shutter curtain having a single aperture therein, providing an unvarying exposure opening, and also comprising a capping curtain mounted in close parallelism with said shutter curtain, rewind gears for said curtains respectively, electric wiring in said camera providing an electrical circuit, an electric motor in said circuit, a shutter rewind electric switch in said circuit, a switch-operating lengthwise-movable bar, a formation upon one of said rewind gears to move said bar in one lengthwise direction, thereby closing said shutter rewind electric switch, a formation upon one of said rewind gears to move said bar in the opposite lengthwise direction, thereby opening said shutter rewind electric switch, a solenoid magnet in said circuit, an adjacent bar-like lengthwise-movable member having an armature, means acted upon by lengthwise movement of said bar-like member, when said solenoid magnet is energized, to release the shutter for running down, said means acted upon by lengthwise movement of said bar-like member, including a release dog and curtain rewind drive member 166 carried by one of the shutter rewind drive gears, and a pivoted shutter latch or release pawl 177 positioned to engage said release dog and curtain rewind drive member 166, and means cooperating with said rewind gears for rewinding both of said curtains.

16. In a photographic camera, a focal plane shutter comprising a shutter curtain having a single aperture therein, providing an unvarying exposure opening, and also comprising a capping curtain mounted in close parallelism with said shutter curtain, rewind gears for said curtains respectively, electric wiring in said camera providing an electrical circuit, an electric motor in said circuit, a shutter rewind electric switch in said circuit, a switch-operating lengthwise-movable bar, a formation upon one of said rewind gears to move said bar in one lengthwise direction, thereby closing said shutter rewind electric switch, a formation upon one of said rewind gears to move said bar in the opposite lengthwise direction, thereby opening said shutter rewind electric switch, a solenoid magnet in said circuit, an adjacent bar-like lengthwise-movable member having an armature, means acted upon by lengthwise movement of said bar-like member, when said solenoid magnet is energized, to release the shutter for running down, said means acted upon by lengthwise movement of said bar-like member, including a release dog and curtain rewind drive member 166 carried by one of the shutter rewind drive gears, and a pivoted shutter latch or release pawl 177 positioned to engage said release dog and curtain rewind drive member 166, and means cooperating with said rewind gears for rewinding both of said curtains, said last mentioned means including a shutter rewind clutch magnet and an adjacent armature, and a lever connected to said armature and having a gear adapted, when said lever is moved by energization of said shutter rewind clutch magnet, to be brought into mesh with one of said rewind gears for rewinding the curtains.

ARCHIE H. GOREY.

REFERENCES CITED

The following references are of record in the file of this patent:

UNITED STATES PATENTS

| Number | Name | Date |
|---|---|---|
| 313,677 | Loeffler | Mar. 10, 1885 |
| 704,755 | Orth | July 15, 1902 |
| 1,075,751 | Barberie | Oct. 14, 1913 |
| 1,262,671 | Howell | Apr. 16, 1918 |
| 1,544,145 | Foothorap | June 30, 1925 |
| 1,707,849 | Fairchild | Apr. 2, 1929 |
| 2,133,011 | Black | Oct. 11, 1938 |
| 2,242,124 | Hineline | May 13, 1941 |
| 2,309,300 | Briechle et al. | Jan. 26, 1943 |
| 2,362,815 | Gorey et al. | Nov. 14, 1944 |
| 2,371,593 | Gorey et al. | Mar. 13, 1945 |
| 2,380,034 | Doyle | July 10, 1945 |
| 2,386,575 | Simmon et al. | Oct. 9, 1945 |
| 2,392,071 | Terrett et al. | Jan. 1, 1946 |
| 2,393,534 | Hineline | Jan. 22, 1946 |
| 2,407,277 | Hineline | Sept. 10, 1946 |

FOREIGN PATENTS

| Number | Country | Date |
|---|---|---|
| 222,548 | Great Britain | Sept. 29, 1924 |

Certificate of Correction

Patent No. 2,517,658

August 8, 1950

ARCHIE H. GOREY

It is hereby certified that error appears in the above numbered patent requiring correction as follows:

In the grant, line 1, name of inventor, for "Archie H. Goery" read *Archie H. Gorey*;
and that the said Letters Patent should be read with this correction therein that the same may conform to the record of the case in the Patent Office.

Signed and sealed this 12th day of September, A. D. 1950.

[SEAL]

THOMAS F. MURPHY,
*Assistant Commissioner of Patents.*